United States Patent
Kishigami et al.

(10) Patent No.: US 9,448,303 B2
(45) Date of Patent: Sep. 20, 2016

(54) RADAR DEVICE

(75) Inventors: Takaaki Kishigami, Tokyo (JP); Yoichi Nakagawa, Tokyo (JP); Hirohito Mukai, Tokyo (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 301 days.

(21) Appl. No.: 14/122,175

(22) PCT Filed: May 25, 2012

(86) PCT No.: PCT/JP2012/003443
§ 371 (c)(1),
(2), (4) Date: Nov. 25, 2013

(87) PCT Pub. No.: WO2012/164898
PCT Pub. Date: Dec. 6, 2012

(65) Prior Publication Data
US 2014/0085128 A1    Mar. 27, 2014

(30) Foreign Application Priority Data
Jun. 1, 2011    (JP) ................................ 2011-123384

(51) Int. Cl.
*G01S 13/08*    (2006.01)
*G01S 13/06*    (2006.01)
(Continued)

(52) U.S. Cl.
CPC ................ *G01S 13/06* (2013.01); *G01S 7/023* (2013.01); *G01S 7/28* (2013.01); *G01S 7/42* (2013.01);
(Continued)

(58) Field of Classification Search
CPC ......... G01S 13/06; G01S 7/023; G01S 13/42

USPC .......................... 342/59, 118, 134, 175, 202
See application file for complete search history.

(56) References Cited

U.S. PATENT DOCUMENTS

| | | | |
|---|---|---|---|
| 6,587,072 B1 * | 7/2003 | Gresham | G01S 7/282 342/25 R |
| 6,917,327 B2 | 7/2005 | Jenkins | |

(Continued)

FOREIGN PATENT DOCUMENTS

| | | |
|---|---|---|
| CN | 101151551 A | 3/2008 |
| CN | 101398483 A | 4/2009 |

(Continued)

OTHER PUBLICATIONS

Extended European Search Report dated Jan. 13, 2015, for corresponding EP Application No. 12793629.2-1811 / 2717067, 7 pages.

(Continued)

*Primary Examiner* — John B Sotomayor
*Assistant Examiner* — Marcus Windrich
(74) *Attorney, Agent, or Firm* — Seed IP Law Group PLLC

(57) ABSTRACT

A first radar transmitter and a second radar transmitter transmit a first modulation signal and a second modulation signal which are generated by repeating a predetermined time of code sequences, each of which has a predetermined code length, using a first code width and a second code width, respectively. An A/D converter converts the modulation signal into a discrete signal in a sampling cycle shorter than a difference between the first code width and the second code width. A positioning section separates a plurality of reception signals using a first correlation value based on outputs from the A/D converter and a first delay section corresponding to the first code width and a second correlation value based on outputs from the A/D converter and a second delay section corresponding to the second code width.

14 Claims, 21 Drawing Sheets

(51) Int. Cl.
*G01S 13/28* (2006.01)
*G01S 13/02* (2006.01)
*G01S 13/87* (2006.01)
*G01S 7/02* (2006.01)
*G01S 7/28* (2006.01)
*G01S 7/42* (2006.01)
*G01S 13/42* (2006.01)
*G01S 13/00* (2006.01)
*G01S 7/288* (2006.01)

(52) U.S. Cl.
CPC .............. *G01S 13/02* (2013.01); *G01S 13/284* (2013.01); *G01S 13/288* (2013.01); *G01S 13/42* (2013.01); *G01S 13/878* (2013.01); *G01S 13/003* (2013.01); *G01S 2007/2886* (2013.01)

(56) References Cited

U.S. PATENT DOCUMENTS

| | | | | |
|---|---|---|---|---|
| 7,366,480 | B2* | 4/2008 | Amano | H04B 7/0805 455/101 |
| 8,169,889 | B2* | 5/2012 | Walton | H04B 7/0413 370/208 |
| 8,228,894 | B2 | 7/2012 | Izumi et al. | |
| 8,724,749 | B2* | 5/2014 | Naguib | H04B 1/71072 375/346 |
| 8,823,583 | B2* | 9/2014 | Hasch | G01S 7/354 342/118 |
| 2004/0178952 | A1* | 9/2004 | Jenkins | G01S 7/023 342/202 |
| 2006/0104382 | A1* | 5/2006 | Yang | H04B 7/043 375/267 |
| 2009/0015464 | A1 | 1/2009 | Fukuda | |
| 2009/0079617 | A1* | 3/2009 | Shirakawa | G01S 13/325 342/146 |
| 2009/0117859 | A1* | 5/2009 | Smith | H04B 7/0413 455/78 |
| 2009/0180466 | A1* | 7/2009 | Soul | H03J 7/04 370/350 |
| 2009/0304128 | A1 | 12/2009 | Izumi et al. | |
| 2010/0040044 | A1* | 2/2010 | Izumi | H04L 7/042 370/350 |
| 2011/0013716 | A1* | 1/2011 | Brodzik | G01S 13/003 375/295 |
| 2013/0342387 | A1* | 12/2013 | Zwick | G01S 13/325 342/202 |
| 2015/0168546 | A1* | 6/2015 | Nakagawa | G01S 7/282 342/21 |

FOREIGN PATENT DOCUMENTS

| | | |
|---|---|---|
| JP | 01-257284 A | 10/1989 |
| JP | 02165086 A | 6/1990 |
| JP | 08065264 A | 3/1996 |
| JP | 2004271529 A | 9/2004 |
| JP | 2010041459 A | 2/2010 |
| JP | 2010045597 A | 2/2010 |

OTHER PUBLICATIONS

Chinese Search Report dated Oct. 28, 2014, for corresponding CN Application No. 2012800237849, 4 pages.

Miwa et al., "Tx and Rx Modulation MIMO Radar System with Orthogonal Codes," IEICE Trans. Commun., vol. E94-B(2), Feb. 2011, pp. 546-553.

International Search Report and Written Opinion dated Aug. 28, 2012, for corresponding International Application No. PCT/JP2012/003443, 8 pages.

* cited by examiner

RADAR DEVICE

TECHNICAL FIELD

The present disclosure relates to a radar device that receives a reflected wave signal from a target by using an antenna and detects the target.

BACKGROUND ART

A radar device radiates radio waves which are generated based on a radar transmission signal from a measurement point to a space, receives a reflected wave signal from a target, and measures at least one of the distance between the measurement point and the target, the position of the target and direction of the target. In recent years, particularly, a multiple-input multiple-output (MIMO) radar device has been developed in which a transmission-side system and a reception-side system each use a plurality of antennas.

In the MIMO radar device, the transmission-side system transmits the radar transmission signals from a plurality of antennas substantially at the same time and the reception-side system separately receives the radar transmission signals, which are reflected waves from the target, using a plurality of antennas. According to the MIMO radar device, since the radar transmission signals are transmitted from a plurality of antennas substantially at the same time, it is possible to reduce the time required to measure the target.

There is a MIMO radar device which receives a reflected wave signal from the same target through a plurality of different paths. Therefore, when propagation fading occurs, it is possible to improve the detection accuracy of a target and a sensing distance based on a diversity effect.

For example, Non Patent Literature 1 discloses as an example of the MIMO radar device according to the related art. In the MIMO radar device according to the related art, a transmission-side system transmits each radar transmission signal multiplied by orthogonal code sequences which are orthogonal to each other from a plurality of antennas at the same time. In the MIMO radar device according to the related art, a reception-side system multiplies each signal received by a plurality of antennas by an orthogonal code sequence orthogonal to the orthogonal code sequence used in the transmission-side system to separate each reception signal. According to the MIMO radar device of the related art, it is possible to reduce the time required to measure a target.

CITATION LIST

Non Patent Literature

Non Patent Literature 1: Miwa et al., "Tx and Rx Modulation MIMO Radar System with Orthogonal Codes", IEICE Trans. Commun., Vol. E94-B, No. 2, February 2011, pp. 546

SUMMARY OF INVENTION

Technical Problem

The inventors studied a radar device which receives reflected wave signals when radar transmission signals transmitted from a plurality of antennas are reflected from the target using a plurality of antennas and detected the target. However, in the radar device according to the related art, when the radar transmission signals which are orthogonal to each other are transmitted from a plurality of antennas, the interference between codes occurs in each radar transmission signal.

Accordingly, an object of the present disclosure is to provide a radar device that suppresses the interference between codes in radar transmission signals which are orthogonal to each other, in order to solve the above-mentioned problems.

Solution to Problem

The present disclosure provides a radar device which includes a first radar transmitter including: a first transmission signal generator, configured to generate a first modulation signal in which a predetermined number of code sequences are repeated using a first code width, each code sequence having a predetermined code length; and a first transmission RF section, configured to convert the first modulation signal into a first radio-frequency radar transmission signal and transmit the first radar transmission signal from a first transmission antenna; and a second radar transmitter which includes: a second transmission signal generator, configured to generate a second modulation signal in which a predetermined number of code sequences are repeated using a second code width, each code sequence having the predetermined code length; and a second transmission RF section, configured to convert the second modulation signal into a second radio-frequency radar transmission signal and transmit the second radar transmission signal from a second transmission antenna.

The present disclosure provides a radar device including: a first radar transmitter which includes: a first transmission signal generator, configured to generate a first modulation signal in which a predetermined number of code sequences are repeated, each code sequence having a first code length; and a first transmission RF section, configured to convert the first modulation signal into a first radio-frequency radar transmission signal and transmit the first radar transmission signal from a first transmission antenna; and a second radar transmitter which includes: a second transmission signal generator, configured to generate a second modulation signal in which a predetermined number of code sequences are repeated, each code sequence having a second code length; and a second transmission RF section, configured to convert the second modulation signal into a second radio-frequency radar transmission signal and transmit the second radar transmission signal from a second transmission antenna, wherein, codes in the first modulation signal and the second modulation signal have a common duration and one of the first code length and the second code length is not an integer multiple of the other code length.

Advantageous Effects of Invention

The radar device according to the present disclosure can be achieved by a simple structure, without adding a circuit structure for synchronizing the operation of transmission-side systems.

Figure 1:
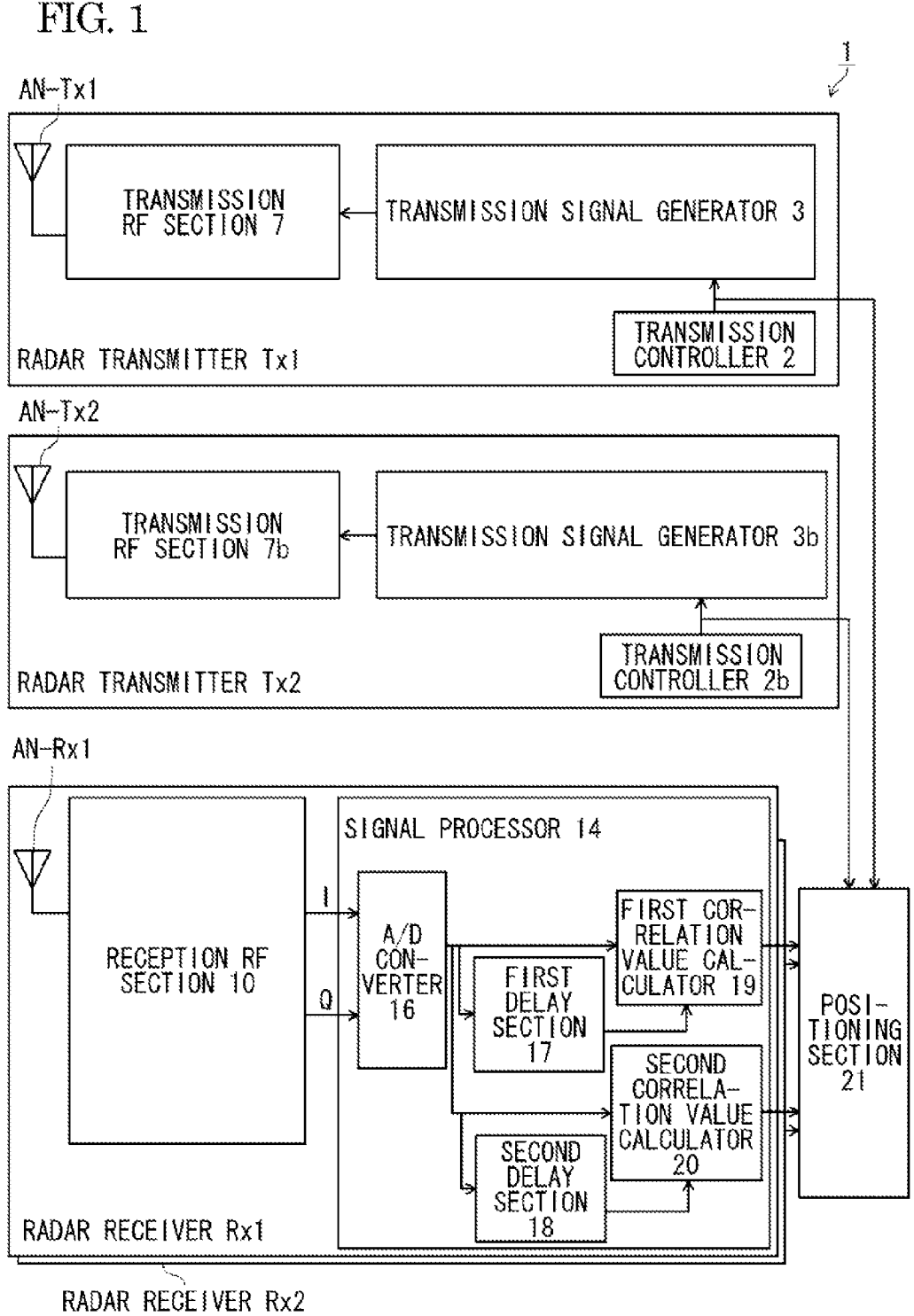
FIG. 1 is a block diagram illustrating briefly the internal structure of a radar device according to a first embodiment.

DESCRIPTION OF EMBODIMENTS (Prehistory of the Present Disclosure)

In the MIMO radar device disclosed in Non Patent Literature 1, when radar transmission signals which are orthogonal to each other are transmitted from a plurality of antennas, the operations of the antennas of each transmission-side system need to be synchronized with each other in order to suppress the interference between the codes due to each radar transmission signal.

In order to meet the requirements, it is necessary to add a structure which supplies a reference signal for synchronizing the operations of the antennas of each transmission-side system and the circuit structure of the MIMO radar device becomes complicated.

The present disclosure has been made in view of the above-mentioned problems and an object of the present disclosure is to provide a radar device with a simple structure in which a circuit structure for synchronizing the operations of each transmission-side system is not added.

(Summary of the Present Disclosure)

A radar device according to the present disclosure includes a first radar transmitter including a first transmission signal generator, configured to generate a first modulation signal in which a predetermined number of code sequences are repeated using a first code width, each code sequence having a predetermined code length; and a first transmission RF section, configured to convert the first modulation signal into a first radio-frequency radar transmission signal and transmit the first radar transmission signal from a first transmission antenna; and a second radar transmitter which includes: a second transmission signal generator, configured to generate a second modulation signal in which a predetermined number of code sequences are repeated using a second code width, each code sequence having the predetermined code length; and a second transmission RF section, configured to convert the second modulation signal into a second radio-frequency radar transmission signal and transmit the second radar transmission signal from a second transmission antenna.

According to this configuration, when radar transmission signals which are orthogonal to each other are transmitted, it is possible to suppress the interference between codes of each radar transmission signal.

A radar device according to the present disclosure includes: a first radar transmitter which includes: a first transmission signal generator, configured to generate a first modulation signal in which a predetermined number of code sequences are repeated, each code sequence having a first code length; and a first transmission RF section, configured to convert the first modulation signal into a first radio-frequency radar transmission signal and transmit the first radar transmission signal from a first transmission antenna; and a second radar transmitter which includes: a second transmission signal generator, configured to generate a second modulation signal in which a predetermined number of code sequences are repeated, each code sequence having a second code length; and a second transmission RF section, configured to convert the second modulation signal into a second radio-frequency radar transmission signal and transmit the second radar transmission signal from a second transmission antenna, wherein, codes in the first modulation signal and the second modulation signal have a common duration and one of the first code length and the second code length is not an integer multiple of the other code length.

According to this configuration, when the radar transmission signals which are orthogonal to each other are transmitted, it is possible to suppress the interference between the codes of each radar transmission signal. In addition, it is possible to separate reflected wave signals obtained when each radar transmission signal transmitted from each radar transmitter is reflected from a target.

Hereinafter, each embodiment of the present disclosure will be described with reference to the accompanying drawings.

In the following description, a radar device according to the present disclosure includes a plurality of transmission-side systems, each having one transmission antenna, and a plurality of reception-side systems, each having one reception antenna. For example, the radar device includes two transmission-side systems and two reception-side systems. The transmission antenna or the reception antenna may be a transmission antenna element or a reception antenna element.

(First Embodiment)

Figure 2:
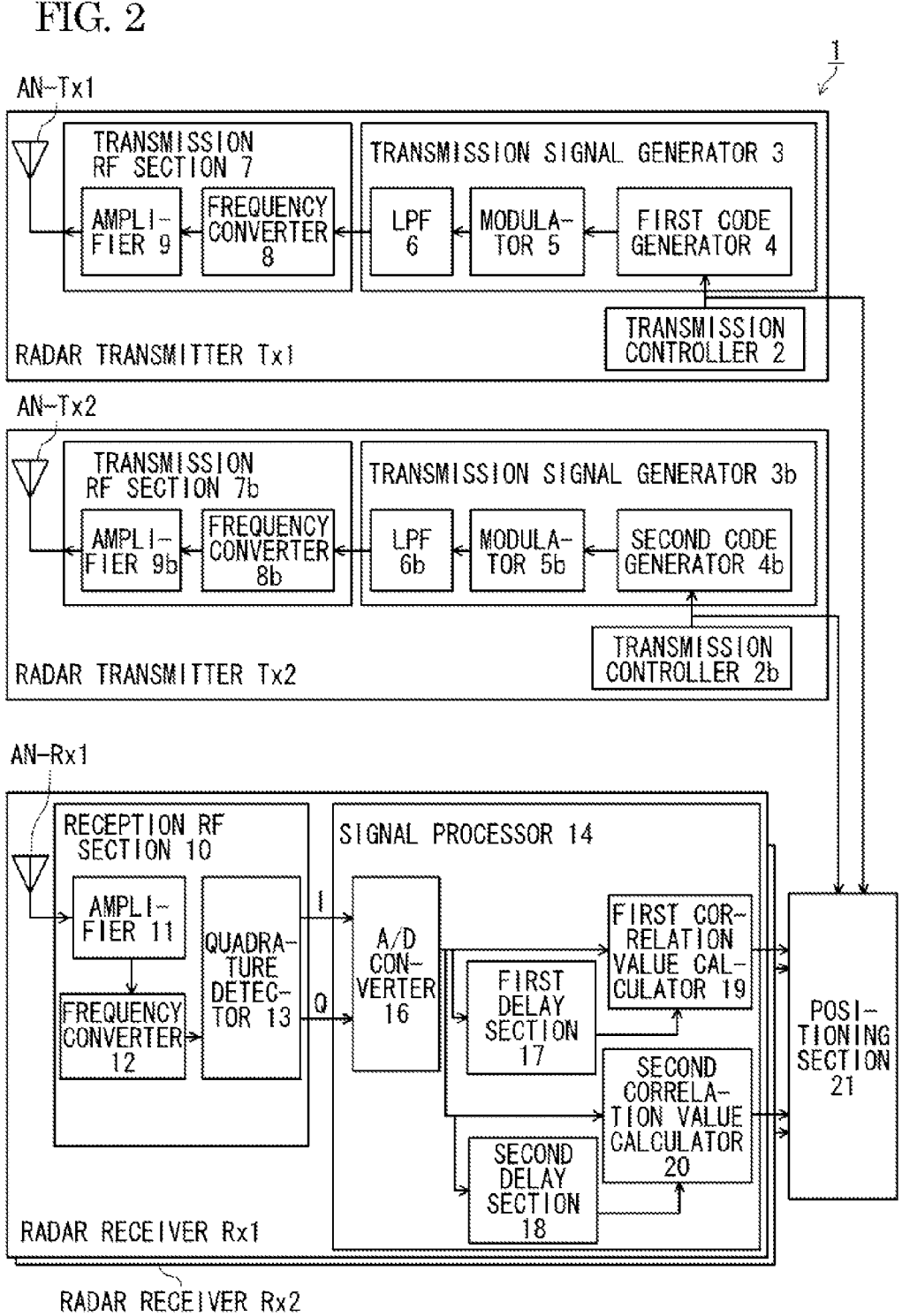
FIG. 2 is a block diagram illustrating in detail the internal structure of the radar device according to the first embodiment.
Figure 3:
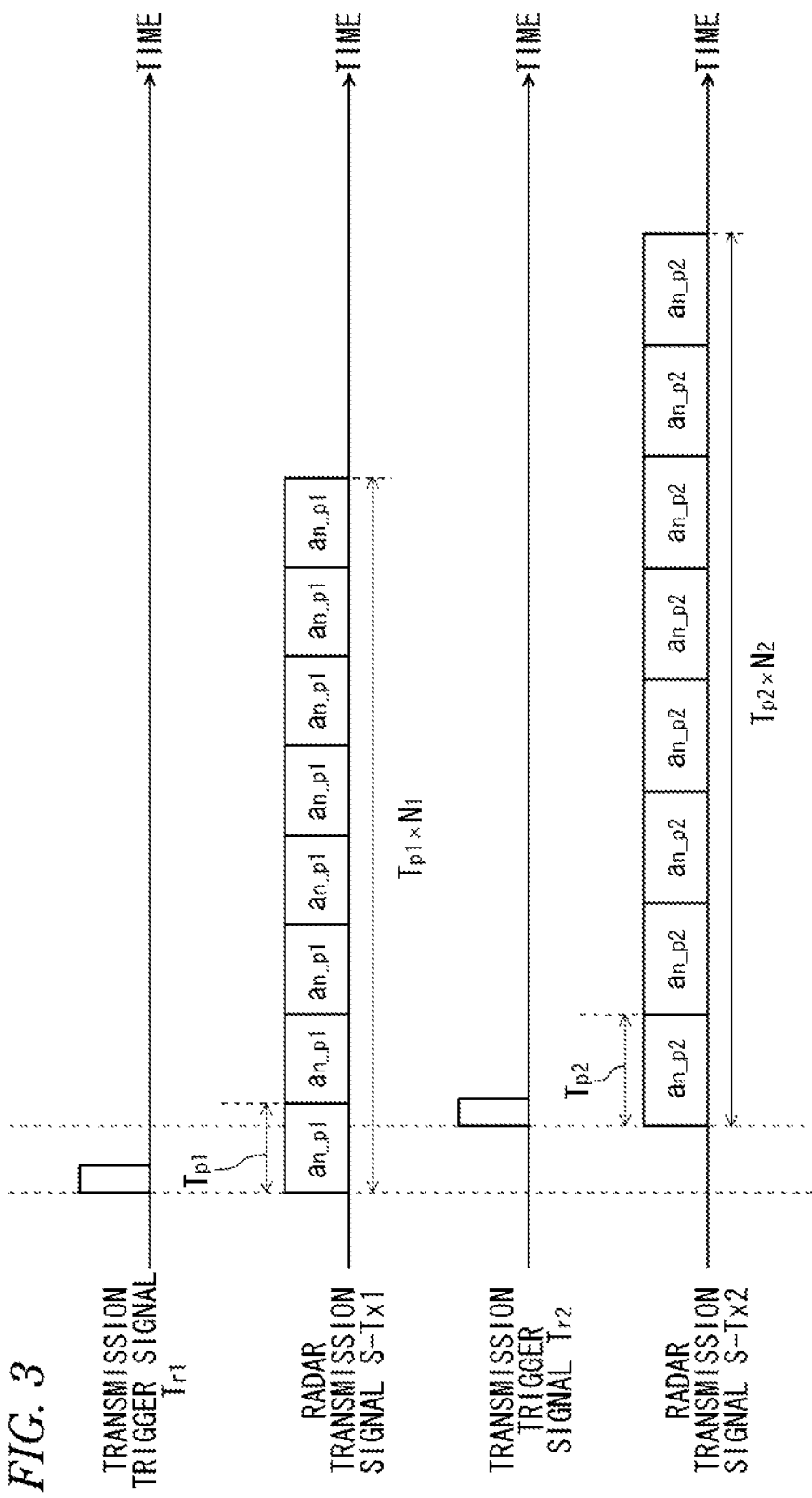
FIG. 3 is a timing chart illustrating an example of the relationship between each transmission trigger signal and each radar transmission signal.
Figure 4:
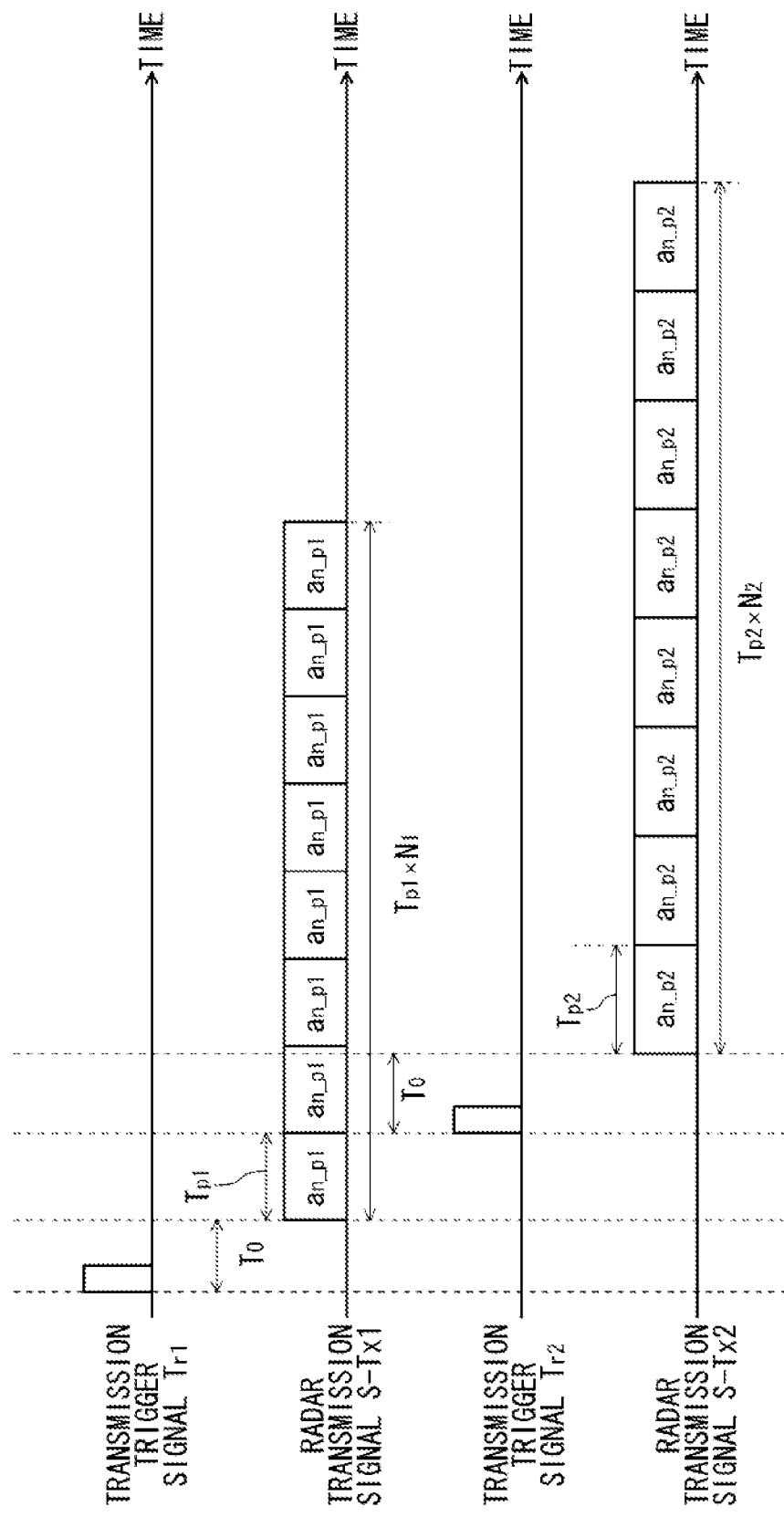
FIG. 4 is a timing chart illustrating another example of the relationship between each transmission trigger signal and each radar transmission signal.
Figure 5:
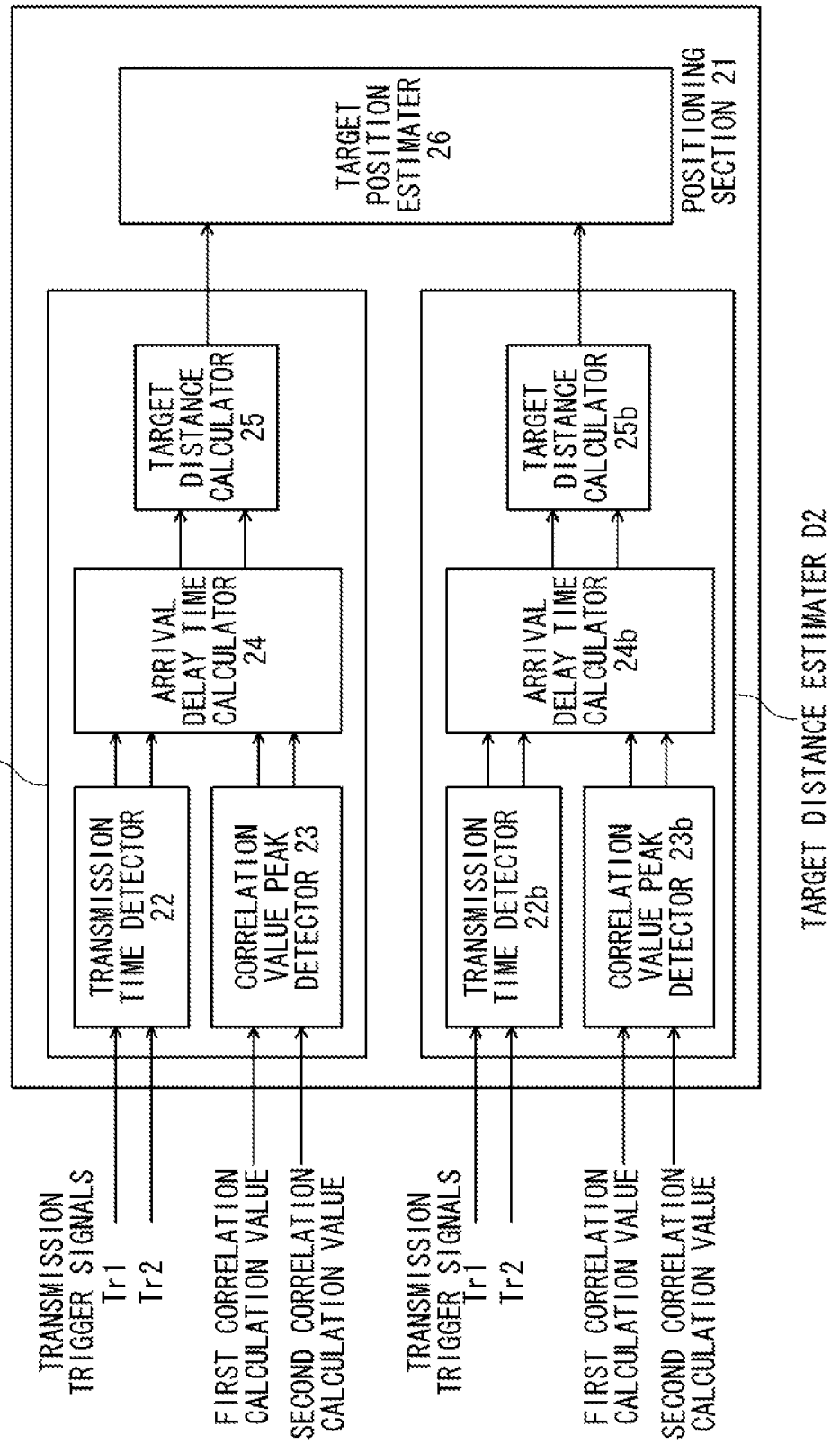
FIG. 5 is a block diagram illustrating in detail the internal structure of a positioning section.
Figure 6:
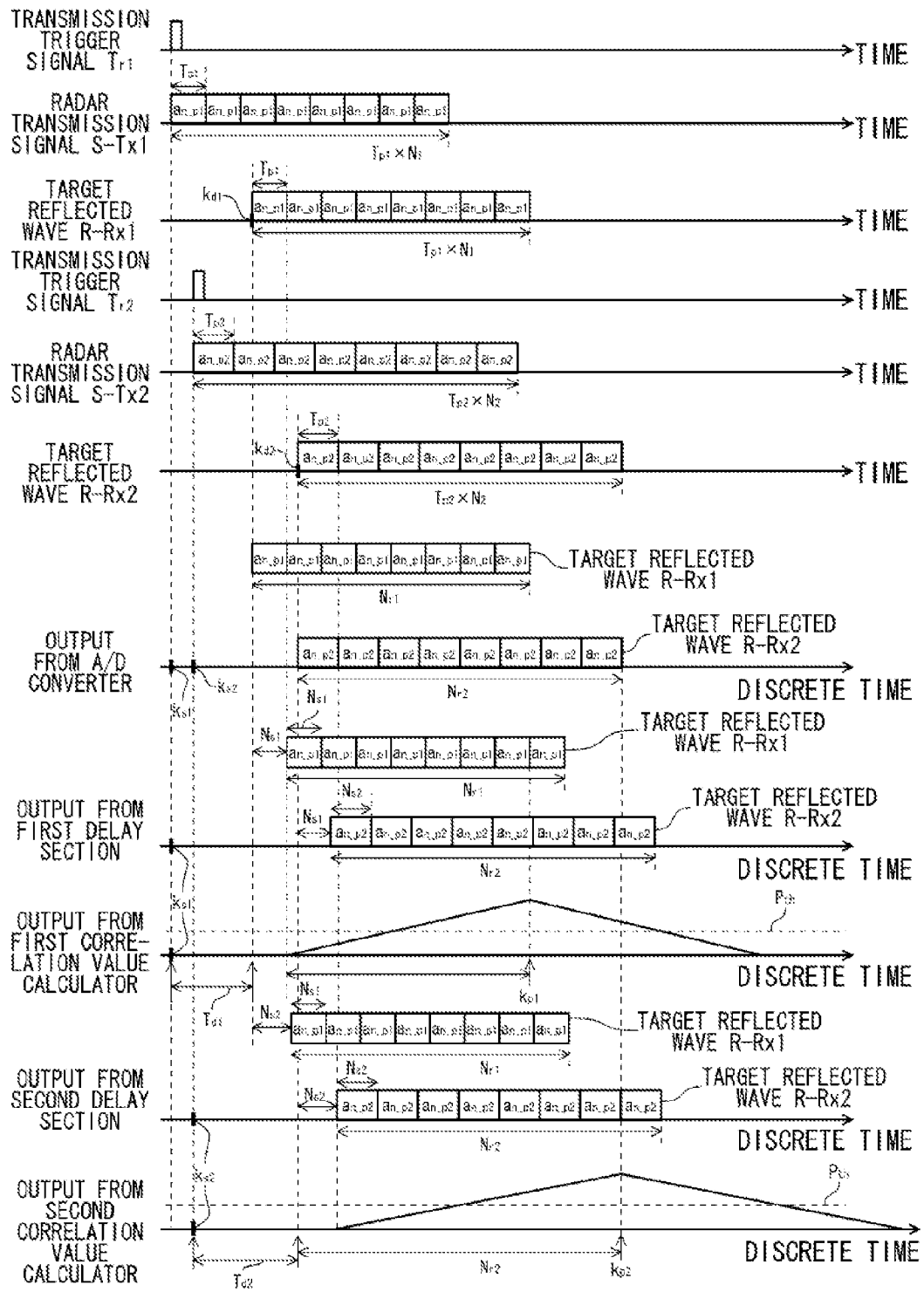
FIG. 6 is a timing chart illustrating an example of the relationship between a radar transmission signal from a radar transmitter and an output signal from each section of a radar receiver.

The structure and operation of a radar device 1 according to a first embodiment will be described with reference to FIGS. 1 to 6. FIG. 1 is a block diagram illustrating briefly the internal structure of the radar device 1 according to the first embodiment. FIG. 2 is a block diagram illustrating in detail the internal structure of the radar device 1 according to the first embodiment. FIG. 3 is a timing chart illustrating an example of the relationship between each transmission trigger signal and each radar transmission signal. FIG. 4 is a timing chart illustrating another example of the relationship between each transmission trigger signal and each radar transmission signal. FIG. 5 is a block diagram illustrating in detail the internal structure of a positioning section 21. FIG. 6 is a timing chart illustrating an example of the relationship between a radar transmission signal from a radar transmitter and output signals from each section of a radar receiver.

In the radar device 1, a radar transmitter Tx1 transmits a radio-frequency radar transmission signal S-Tx1 from a transmission antenna AN-Tx1 and a radar transmitter Tx2 transmits a radio-frequency radar transmission signal S-Tx2 from a transmission antenna AN-Tx2. The radar transmission signals S-Tx1 and S-Tx2 may be transmitted at different times (asynchronously) or at the same time (synchronously). In this case, the same effect is obtained regardless of the transmission time. However, when the radar transmission signals are asynchronously transmitted, a circuit for synchronization is not needed and the structure of the radar device 1 is simplified.

A radar receiver Rx1 receives the reflected wave signal of the radar transmission signal S-Tx1 or S-Tx2 from the target, using a reception antenna AN-Rx1. A radar receiver Rx2 receives the reflected wave signal of the radar transmission signal S-Tx1 or S-Tx2 from the target, using a reception antenna AN-Rx2.

The radar device 1 performs signal processing for the signals received by each of the reception antennas AN-Rx1 and AN-Rx2 to detect whether there is a target, the distance to the target, and the position of the target. The target is an object to be detected by the radar device 1 and includes, for example, a vehicle or a person, which holds for the following embodiments.

First, the structure of each section of the radar device 1 will be described briefly.

As shown in FIG. 1, the radar device 1 includes two radar transmitters Tx1 and Tx2 two radar receivers Rx1 and Rx2, and a positioning section 21. The radar transmitter Tx1 includes a transmission controller 2, a transmission signal generator 3, and a transmission RF section 7 connected to the transmission antenna AN-Tx1. The radar transmitter Tx2 includes a transmission controller 2b, a transmission signal generator 3b, and a transmission RF section 7b connected to the transmission antenna AN-Tx2.

The radar receiver Rx1 includes a reception RF section 10 connected to the reception antenna AN-Rx1 and a signal processor 14. Similarly to the radar receiver Rx1, the radar receiver Rx2 includes a reception RF section connected to the reception antenna and a signal processor. The signal processor 14 includes an A/D converter 16, a first delay section 17, a second delay section 18, a first correlation value calculator 19, and a second correlation value calculator 20. The radar receivers Rx1 and Rx2 have the same structure. Hereinafter, in the operation of the radar receivers, the radar receiver Rx1 will be described as an example, which holds for the following embodiments.

(Radar Transmitter)

Next, the structure of each section of the radar transmitters Tx1 and Tx2 will be described in detail with reference to FIG. 2.

As shown in FIG. 2, the radar transmitter Tx1 includes the transmission controller 2, the transmission signal generator 3, and the transmission RF section 7 connected to the transmission antenna AN-Tx1.

The transmission signal generator 3 includes a first code generator 4, a modulator 5, and a low-pass filter (LPF) 6. In FIG. 2, the transmission signal generator 3 includes the LPF 6. However, the LPF 6 may be provided in the radar transmitter Tx1 independently from the transmission signal generator 3. The transmission RF section 7 includes a frequency converter 8 and an amplifier 9.

As shown in FIG. 2, the radar transmitter Tx2 includes the transmission controller 2b, the transmission signal generator 3b, and the transmission RF section 7b connected to the transmission antenna AN-Tx2.

The transmission signal generator 3b includes a second code generator 4b, a modulator 5b, and a low-pass filter (LPF) 6b. Similarly, in FIG. 2, the transmission signal generator 3b includes the LPF 6b. However, the LPF 6b may be provided in the radar transmitter Tx2 independently from the transmission signal generator 3b. The transmission RF section 7b includes a frequency converter 8b and an amplifier 9b.

Next, the operation of each section of the radar transmitters Tx1 and Tx2 will be described in detail.

Each section of the radar transmitters Tx1 and Tx2 operates based on the signals obtained by multiplying reference signals generated by different reference signal oscillators (not shown) by a predetermined value. Therefore, in the radar device 1, the operations of the radar transmitters Tx1 and Tx2 are not synchronized with each other. However, a reference signal generated by a common reference signal oscillator may be input to the radar transmitters Tx1 and Tx2 in order to synchronize the operations of the radar transmitters Tx1 and Tx2. The multiplied signals supplied to the transmission signal generator 3 and the transmission RF section 7 may be multiplied by different values or the same value.

The operation of each section of the radar transmitter Tx1 will be described.

The transmission signal generator 3 modulates a code sequence $b_n$ with a code length L based on a transmission trigger signal $T_{r1}$ (see the first stage of FIG. 3) from the transmission controller 2 to generate $N_1$ baseband pulse compression codes (transmission signals) $a_{n\_p1}$ (see the second stage of FIG. 3). A parameter $N_1$ is a predetermined integer, a parameter n is in the range of 1 to L, and a parameter L indicates the code length of the code sequence $b_n$.

The transmission RF section 7 converts the $N_1$ baseband pulse compression codes (transmission signals) $a_{n\_p1}$ generated by the transmission signal generator 3 into the radio-frequency radar transmission signal S-Tx1 and transmits the radio-frequency radar transmission signal S-Tx1 from the transmission antenna AN-Tx1.

The radar transmission signal S-Tx1 which is generated based on the pulse compression codes $a_{n\_p1}$ with the code length L is transmitted for a transmission time with a pulse code width $T_{p1}$. That is, in the radar transmission signal S-Tx1 which is generated based on the pulse compression codes $a_{n\_p1}$ with the code length L, the pulse width $T_{s1}$ per code is represented as shown in Expression (1). The radar transmission signal S-Tx1 which is repeatedly generated $N_1$ times based on the pulse compression code $a_{n\_p1}$ with the code length L is transmitted for a transmission time with a pulse code width $T_{p1} \times N_1$ (see the second stage of FIG. 3).

[Expression 1]

$$T_{s1} = \frac{T_{p1}}{L} \quad (1)$$

The transmission controller 2 outputs the transmission trigger signal $T_{r1}$ indicating a generation time of the transmission signal to the first code generator 4 in each predetermined first radar transmission cycle.

The first code generator 4 repeatedly generates a transmission code for pulse compression of the code sequence $b_n$ with the code length L $N_1$ times based on the transmission trigger signal $T_{r1}$ output from the transmission controller 2. It is preferable that the transmission code for pulse compression have high auto-correlation. For example, an M sequence code, a Barker code sequence, or a Golay code sequence is used as the transmission code for pulse compression, which holds for the following embodiments. In the second stage of FIG. 3, for example, the parameter $N_1$ is 8.

The first code generator 4 outputs the generated transmission code of the code sequence $b_n$ to the modulator 5. Hereinafter, for convenience, the transmission code of the code sequence $b_n$ is referred to as a transmission code $b_n$. In the second stage of FIG. 3, the radar transmission signal S-Tx1 is transmitted at the rising edge of the transmission trigger signal $T_{r1}$. However, for example, the radar transmission signal S-Tx1 may be transmitted at the falling edge of the transmission trigger signal $T_{r1}$.

In some cases, the radar transmission signal S-Tx1 is generated at the rising edge of the transmission trigger signal $T_{r1}$ and a time $T_o$ is required for the radar transmission signal S-Tx1 to be transmitted to a terminal portion of the transmission antenna AN-Tx1 (see the second stage of FIG. 4). In this case, the time $T_o$ required is measured in advance and is then subtracted from the calculation result of the positioning section 21, which will be described below. In this way, it is possible to reduce an error in the measurement of the distance to the target of the radar device 1.

The modulator 5 receives the transmission code $b_n$ output from the first code generator 4. The modulator 5 performs pulse modulation for the received transmission code $b_n$ to generate the baseband pulse compression code (transmission signal) $a_{n\_p1}$. The pulse modulation is amplitude modulation, amplitude shift keying (ASK), or phase shift keying (PSK). The modulator 5 outputs the transmission signal $a_{n\_p1}$ below a predetermined limited band among the generated transmission signals $a_{n\_p1}$ to the transmission RF section 7 through the LPF 6.

The frequency converter 8 up-converts the transmission signal $a_{n\_p1}$ generated by the transmission signal generator 3 into, for example, a radio frequency band including a millimeter-wave band to generate the radar transmission signal S-Tx1 in a carrier frequency band. The frequency converter 8 outputs the generated radar transmission signal S-Tx1 to the amplifier 9.

The amplifier 9 amplifies the level of the radar transmission signal S-Tx1 output from the frequency converter 8 to a predetermined level and outputs the amplified radar transmission signal S-Tx1 to the transmission antenna AN-Tx1. The amplified radar transmission signal S-Tx1 is radiated and transmitted to a space through the transmission antenna AN1.

The transmission antenna AN-Tx1 radiates the radar transmission signal S-Tx1 output from the transmission RF section 7 to a space and transmits the radar transmission signal S-Tx1. As shown in the second stage of FIG. 3, the radar transmission signal S-Tx1 is transmitted as a transmission time of $T_{p1} \times N_1$.

Next, the operation of each section of the radar transmitter Tx2 will be described.

The transmission signal generator 3b modulates the code sequence $b_n$ with the code length L based on a transmission trigger signal $T_{r2}$ (see the third stage of FIG. 3) from the transmission controller 2b to generate $N_2$ baseband pulse compression codes (transmission signals) $a_{n\_p2}$ (see the fourth stage of FIG. 3). A parameter $N_2$ is a predetermined integer, a parameter n is in the range of 1 to L, and a parameter L indicates the code length of the code sequence $b_n$.

The transmission RF section 7b converts the $N_2$ baseband pulse compression codes (transmission signals) $a_{n\_p2}$ generated by the transmission signal generator 3b into the radio-frequency radar transmission signal S-Tx2 and transmits the radio-frequency radar transmission signal S-Tx2 from the transmission antenna AN-Tx2.

The radar transmission signal S-Tx2 which is generated based on the pulse compression codes $a_{n\_p2}$ with the code length L is transmitted for a transmission time with a pulse code width $T_{p2}$. That is, in the radar transmission signal S-Tx2 which is generated based on the pulse compression codes $a_{n\_p2}$ with the code length L, the pulse width $T_{s2}$ per code is represented as shown in Expression (2). The radar transmission signal S-Tx2 which is repeatedly generated $N_2$ times based on the pulse compression codes $a_{n\_p2}$ with the code length L is transmitted for a transmission time with a pulse code width $T_{p2} \times N_2$ (see the fourth stage of FIG. 3).

[Expression 2]

$$T_{s2} = \frac{T_{p2}}{L} \quad (2)$$

The transmission controller 2b outputs the transmission trigger signal $T_{r2}$ indicating the generation time of the transmission signal to the second code generator 4b in each predetermined second radar transmission cycle.

The second code generator 4b repeatedly generates a transmission code for pulse compression of the code sequence $b_n$ with the code length L $N_2$ times based on the transmission trigger signal $T_{r2}$ output from the transmission controller 2b. It is preferable that the transmission code for pulse compression have high auto-correlation. For example, the M sequence code, the Barker code sequence, or the Golay code sequence is used as the transmission code for pulse compression. In the fourth stage of FIG. 3, for example, the parameter $N_2$ is 8.

The second code generator 4b outputs the generated transmission code of the code sequence $b_n$ to the modulator 5b. In the fourth stage of FIG. 3, the radar transmission signal S-Tx2 is transmitted at the rising edge of the transmission trigger signal $T_{r2}$. However, for example, the radar transmission signal S-Tx2 may be transmitted at the falling edge of the transmission trigger signal $T_{r2}$.

In some cases, the radar transmission signal S-Tx2 is generated at the rising edge of the transmission trigger signal $T_{r2}$ and the time $T_o$ is required for the radar transmission signal S-Tx2 to be transmitted to a terminal portion of the transmission antenna AN-Tx2 (see the fourth stage of FIG. 4). In this case, the time $T_o$ required is measured in advance and is then subtracted from the calculation result of the positioning section 21, which will be described below. In this way, it is possible to reduce an error in the measurement of the distance to the target of the radar device 1.

The modulator 5b receives the transmission code $b_n$ output from the second code generator 4b. The modulator 5b performs pulse modulation for the received transmission code $b_n$ to generate the baseband pulse compression code (transmission signal) $a_{n\_p2}$. The modulator 5b outputs the transmission signal $a_{n\_p2}$ below a predetermined limited band among the generated transmission signals $a_{n\_p2}$ to the transmission RF section 7b through the LPF 6b.

The frequency converter 8b up-converts the transmission signal $a_{n\_p2}$ generated by the transmission signal generator 3b into, for example, a radio frequency band including the millimeter-wave band to generate the radar transmission signal S-Tx2 in the carrier frequency band. The frequency converter 8b outputs the generated radar transmission signal S-Tx2 to the amplifier 9b.

The amplifier 9b amplifies the level of the radar transmission signal S-Tx2 output from the frequency converter 8b to a predetermined level and outputs the amplified radar transmission signal S-Tx2 to the transmission antenna AN-Tx2. The amplified radar transmission signal S-Tx2 is radiated and transmitted to a space through the transmission antenna AN2.

The transmission antenna AN-Tx2 radiates the radar transmission signal S-Tx2 output from the transmission RF section 7b to a space and transmits the radar transmission signal S-Tx2. As shown in the fourth stage of FIG. 3, the radar transmission signal S-Tx2 is transmitted as a transmission time of $T_{p2} \times N_2$.

As shown in the second and fourth stages of FIG. 3, parameters $T_{p1}$ and $T_{p2}$ are different from each other, the parameter $T_{p1}$ is not an integer multiple of $T_{p2}$ and Expressions (3) and (4) are established between the parameters $T_{p1}$ and $T_{p2}$. In Expression (4), a parameter $T_{ad}$ indicates a sampling cycle in the A/D converter of the radar receiver, which will be described below.

Since Expression (4) is established, discrete sample delay numbers ($N_{s1}$ and $N_{s2}$) which are obtained by A/D conversion of different A/D converters of the radar receivers Rx1 and Rx2 are different from each other ($N_{s1} \neq N_{s2}$). That is, the radar receivers Rx1 and Rx2 can separate the reflected wave signals obtained when the radar transmission signals S-Tx1 and S-Tx2 transmitted from the radar transmitters Tx1 and Tx2 are reflected from the target.

[Expression 3]

$$T_{p1} < T_{p2} \quad (3)$$

[Expression 4]

$$|T_{p2} - T_{p1}| \geq T_{ad} \quad (4)$$

(Radar Receiver)

Next, the structure of each section of the radar receivers Rx1 and Rx2 will be described in detail with reference to FIG. 2. In this embodiment, the radar device 1 includes two radar receivers Rx1 and Rx2. However, when the distance from the radar device 1 to the target is estimated as in the first embodiment, one radar receiver Rx1 may be used.

As shown in FIG. 2, the radar receiver Rx1 includes the reception RF section 10 connected to one reception antenna AN-Rx1 and the signal processor 14.

The reception RF section 10 includes an amplifier 11, a frequency converter 12, and a quadrature detector 13. The signal processor 14 includes the A/D converter 16, the first delay section 17, the second delay section 18, the first correlation value calculator 19, and the second correlation value calculator 20. The signal processor 14 of the radar receiver Rx1 periodically operates in a first radar transmission cycle $T_{w1}$ (see FIG. 8) as a signal processing period.

Similarly to the radar receiver Rx1, the radar receiver Rx2 (not shown in FIG. 2) includes a reception RF section connected to one reception antenna and a signal processor. The signal processor of the radar receiver Rx2 periodically operates in a second radar transmission cycle $T_{w2}$ (see FIG. 8) as a signal processing period.

Next, the operation of each section of the radar receiver Rx1 will be described in detail. As described above, the radar receivers Rx1 and Rx2 have the same structure and the radar receiver Rx1 will be described as an example.

Each section of the radar receivers Rx1 and Rx2 operates based on the signals obtained by multiplying the reference signals generated by different reference signal oscillators (not shown) by a predetermined value. The multiplied signals supplied to the reception RF section 10 and the signal processor 14 may be multiplied by different values or the same value.

The reception antenna AN-Rx1 receives the reflected waves obtained when the radar transmission signals S-Tx1 and S-Tx2 from the radar transmitters Tx1 and Tx2 are reflected from the target. In some cases, the reception antenna AN-Rx1 receives the reflected wave of any one of the radar transmission signals S-Tx1 and S-Tx2 from the target. The signal received by the reception antenna AN-Rx1 is input to the reception RF section 10.

The operation of each section of the radar receiver Rx1 will be described.

The amplifier 11 receives the reception signal in a radio frequency band which is output from the reception antenna AN-Rx1, amplifies the level of the reception signal in the radio frequency band, and outputs the amplified reception signal to the frequency converter 12.

The frequency converter 12 receives the reception signal in the radio frequency band which is output from the amplifier 11, down-converts the radio-frequency reception signal into a baseband reception signal, and outputs the down-converted baseband reception signal to the quadrature detector 13.

The quadrature detector 13 receives the baseband reception signal output from the frequency converter 12 and performs quadrature detection for the baseband reception signal to generate a baseband reception signal including an in-phase signal and a quadrature signal. The quadrature detector 13 outputs the reception signal including the in-phase signal (I signal) and the quadrature signal (Q signal) to the A/D converter 16.

The A/D converter 18 receives the baseband reception signal including the in-phase signal and the quadrature signal and is output from the quadrature detector 13 and samples the reception signal at each discrete time k to convert the reception signal, which is analog data, into a discrete signal, which is digital data. The A/D converter 16 outputs a component of the reception signal, which is digital data converted at each discrete time k, as a discrete sample value to the first delay section 17 and the first correlation value calculator 19.

The sampling rate ($1/T_{ad}$) of the A/D converter 16 is set to be equal to or more than two times the pulse transmission rates $1/T_{s1}$ and $1/T_{s2}$ which are respectively defined by the pulse widths $T_{s1}$ and $T_{s2}$ per code in the radar transmission signals S-Tx1 and S-Tx2 (sampling theorem). That is, the sampling rate ($1/T_{ad}$) of the A/D converter 16 satisfies Expressions (5) and (6).

[Expression 5]

$$\frac{1}{T_{ad}} > \frac{2}{T_{s1}} \tag{5}$$

[Expression 6]

$$\frac{1}{T_{ad}} > \frac{2}{T_{s2}} \tag{6}$$

In the following description, the reception signal which is converted at the discrete time k by the A/D converter 16 is represented as a complex signal x(k) of Expression (7), using an in-phase signal component $I_r(k)$ and a quadrature signal component $Q_r(k)$, which holds for the following embodiments. In Expression (7), j is an imaginary unit satisfying $j^2=-1$. A parameter k indicates the discrete time when the A/D converter 16 performs sampling.

[Expression 7]

$$x(k)=I_r(k)+jQ_r(k) \tag{7}$$

The first delay section 17 outputs a delay signal $x(k-N_{a1})$ obtained by delaying the reception signal x(k) output from the A/D converter 16 by a time corresponding to a predetermined number of samples $N_{s1}$ to the first correlation value calculator 19. The predetermined number of samples $N_{s1}$ is represented by Expression (8). In Expression (8), round(x) is an integer rounding operator and is an operator which gives an integer value obtained by rounding off a real number (x) to the nearest whole number.

[Expression 8]

$$N_{s1} = \text{round}\left(\frac{T_{p1}}{T_{ad}}\right) \tag{8}$$

The second delay section 18 outputs a delay signal $x(k-N_{s2})$ obtained by delaying the reception signal x(k) output from the A/D converter 16 by a time corresponding to a predetermined number of samples $N_{s2}$ to the second correlation value calculator 20. The predetermined number of samples $N_{s2}$ is represented by Expression (9).

[Expression 9]

$$N_{s2} = \text{round}\left(\frac{T_{p2}}{T_{ad}}\right) \tag{9}$$

The first correlation value calculator 19 receives the reception signal x(k) output from the A/D converter 16 and the delay signal $x(k-N_{s1})$ output from the first delay section 17. The first correlation value calculator 19 calculates a first correlation value $AC_1(k)$ between the reception signal x(k) and the delay signal $x(k-N_{s1})$ according to Expression (10) based on the reception signal x(k) and the delay signal $x(k-N_{s1})$. An asterisk (*) indicates a complex conjugate operator. A parameter $N_{r1}$ is represented by Expression (11). The first correlation value calculator 19 outputs the calculated first correlation value $AC_1(k)$ to the positioning section 21.

[Expression 10]

$$AC_1(k) = \sum_{n=0}^{\text{round}[T_{p1}(N_1-1)/T_{ad}]-1} x(k+n)x(k+n-N_{s1})^* \tag{10}$$

[Expression 11]

$$N_{r1} = \text{round}[T_{p1}N_1/T_{ad}] \tag{11}$$

The second correlation value calculator 20 receives the reception signal x(k) output from the A/D converter 16 and the delay signal $x(k-N_{s2})$ output from the second delay section 18. The second correlation value calculator 20 calculates a second correlation value $AC_2(k)$ between the reception signal x(k) and the delay signal $x(k-N_{s2})$ according to Expression (12) based on the reception signal x(k) and the delay signal $x(k-N_{s2})$. An asterisk (*) indicates a complex conjugate operator. A parameter $N_{r2}$ is represented by Expression (13). The second correlation value calculator 20 outputs the calculated second correlation value $AC_2(k)$ to the positioning section 21.

[Expression 12]

$$AC_2 = \sum_{n=0}^{\text{round}[T_{p2}(N_2-1)/T_{ad}]-1} x(k+n)x(k+n-N_{s2})^* \tag{12}$$

[Expression 13]

$$N_{r2} = \text{round}[T_{p2}N_2/T_{ad}] \tag{13}$$

The first correlation value calculator 19 may use Expression (14) in the calculation of the first correlation value $AC_1(k)$, instead of Expression (10). Similarly, the second correlation value calculator 20 may use Expression (15) in the calculation of the second correlation value $AC_2(k)$, instead of Expression (12).

[Expression 14]

$$AC_2(k) = \sum_{n=0}^{N_{r1}-1} x(k+n)x(k+n-N_{s1})^* \tag{14}$$

[Expression 15]

$$AC_2(k) = \sum_{n=0}^{N_{r2}-1} x(k+n)x(k+n-N_{s2})^* \tag{15}$$

(Positioning Section)

Next, the structure of each section of the positioning section 21 will be described in detail with reference to FIG. 5.

As shown in FIG. 5, the positioning section 21 includes a target distance estimater D1 corresponding to the radar receiver Rx1, a target distance estimater D2 corresponding to the radar receiver Rx2, and a target position estimater 26.

As shown in FIG. 5, the target distance estimater D1 includes a transmission time detector 22, a correlation value peak detector 23, an arrival delay time calculator 24, and a target distance calculator 25. The target distance estimater D2 includes a transmission time detector 22b, a correlation value peak detector 23b, an arrival delay time calculator 24b, and a target distance calculator 25b.

The transmission time detectors 22 and 22b have the same operation, the correlation value peak detectors 23 and 23b have the same operation, the arrival delay time calculators 24 and 24b have the same operation, and the target distance calculators 25 and 25b have the same operation. Therefore, in the following operation of the positioning section 21, the structure of the target distance estimater D1 which is provided in correspondence with the radar receiver Rx1 will be described as an example. The structure of the target distance estimater D2 which is provided in correspondence with the radar receiver Rx2 will be described if necessary.

Next, the operation of the radar receiver Rx1 will be described with reference to FIG. 6. In FIG. 6, the radar transmission signals S-Tx1 (see the second stage of FIG. 6) and S-Tx2 (see the fifth stage of FIG. 6) start to be transmitted based on the transmission trigger signal $T_{r1}$ (see the first stage of FIG. 6) and the transmission trigger signal $T_{r2}$ (see the fourth stage of FIG. 6).

FIG. 6 shows a case in which the transmission trigger signal $T_{r1}$ and the transmission trigger $T_{r2}$ are asynchronously controlled and the radar transmission signals S-Tx1 and S-Tx2 partially overlap each other. In addition, a target reflected wave R-Rx1 (see the third stage of FIG. 6) is a reflected wave when the radar transmission signal S-Tx1 is radiated to the target and is then reflected from the target and a target reflected wave R-Rx2 (see the sixth stage of FIG. 6) is a reflected wave when the radar transmission signal S-Tx2 is radiated to the target and is then reflected from the target.

In the case shown in FIG. 6, the reception times of the reflected waves by the radar receivers Rx1 and Rx2 partially overlap each other. The output x(k) from the A/D converter includes a reception signal sampling signal for a reception signal component of the target reflected wave R-Rx1 and a reception signal component of the target reflected wave R-Rx2 (see the seventh stage of FIG. 6).

The output from the first delay section output (see the eighth stage of FIG. 6) indicates the delay signal $x(k-N_{s1})$ obtained by delaying the reception signal x(k) output from the A/D converter 16 by a predetermined number of samples $N_{s1}$ in the first delay section 17.

The predetermined number of samples $N_{s1}$ is set based on the sample number round$[T_{p1}/T_{ad}]$ of the A/D converter 16 with respect to the pulse code width $T_{p1}$ of the radar transmission signal S-Tx1, as represented by Expression (8). Therefore, the output from the first delay section with respect to the target reflected wave R-Rx1 is delayed substantially in a pulse code width unit $T_{p1}$. However, the output from the first delay section with respect to the target reflected wave R-Rx2 satisfies the relationship $N_{s1} \neq N_{s2}$ from Expression (4) and becomes a delay signal with a delay of one or more samples.

Therefore, as an integral interval increases, the in-phase addition effect of the output from the first correlation value calculator (see the ninth stage of FIG. 6) with respect to the signal of the target reflected wave R-Rx1 can be improved since the first correlation value calculator 19 calculates the correlation between the reception signal x(k) output from the A/D converter 16 and the delay signal $x(k-N_{s1})$ output from the first delay section 17, and the level of the output is higher than that of the reception signal.

The correlation between the signal of the target reflected wave R-Rx2 and a delay signal with a delay of one or more samples is calculated. Since the code sequence $b_n$ with high auto-correlation is used, it is difficult to obtain the in-phase addition effect of the pulse compression code (transmission signal) $a_{n\_p1}$ in the delay signal with a delay of one or more samples. Therefore, the target reflected wave R-Rx1 can be detected separately from the target reflected wave R-Rx2.

The output from the second delay section (see the tenth stage of FIG. 6) indicates a delay signal $x(k-N_{s2})$ obtained by delaying the reception signal x(k) output from the A/D converter 16 by a predetermined number of samples $N_{s2}$ in the second delay section 18.

The predetermined number of samples $N_{s2}$ is set based on the sample number round$[T_{p2}/T_{ad}]$ of the A/D converter 16 with respect to the pulse code width $T_{p2}$ of the radar transmission signal S-Tx2, as represented by Expression (9). Therefore, the output from the second delay section with respect to the target reflected wave R-Rx2 is delayed substantially in a pulse code width unit $T_{p2}$. However, the output from the second delay section with respect to the target reflected wave R-Rx1 satisfies the relationship $N_{s1} \neq N_{s2}$ from Expression (4) and becomes a delay signal with a delay of one or more samples.

Therefore, as an integral interval increases, the in-phase addition effect of the output from the second correlation value calculator (see the tenth stage of FIG. 6) with respect to the signal of the target reflected wave R-Rx2 can be improved since the second correlation value calculator 20 calculates the correlation between the reception signal x(k) output from the A/D converter 16 and the delay signal $x(k-N_{s2})$ output from the second delay section 18, and the level of the output is higher than that of the reception signal.

The correlation between the signal of the target reflected wave R-Rx1 and a delay signal with a delay of one or more samples is calculated. Since the code sequence $b_n$ with high auto-correlation is used, it is difficult to obtain the in-phase addition effect of the pulse compression code (transmission signal) $a_{n\_p2}$ in the delay signal with a delay of one or more samples. Therefore, the target reflected wave R-Rx2 can be detected separately from the target reflected wave R-Rx1.

The positioning section 21 performs the following positioning operation using the transmission trigger signals $T_{r1}$ and $T_{r2}$, and the first correlation value output (that is, the first correlation calculation value $AC_1(k)$ and the second correlation value output (that is, the second correlation calculation value $AC_2(k)$) obtained from the above-mentioned operation result.

The transmission time detector 22 receives the transmission trigger signals $T_{r1}$ and $T_{r2}$ output from the transmission controllers 2 and 2b. The transmission time detector 22 detects the discrete times $k_{s1}$ and $k_{s2}$ of the transmission trigger signals $T_{r1}$ and $T_{r2}$ based on the received transmission trigger signals $T_{r1}$ and $T_{r2}$ (see the seventh to ninth stages and the tenth and eleventh stages of FIG. 6). The transmission time detector 22 outputs the detected discrete times $k_{s1}$ and $k_{s2}$ to the arrival delay time calculator 24.

The correlation value peak detector 23 receives the first correlation value $AC_1(k)$ and the second correlation value $AC_2(k)$, which are the calculation results of the first correlation value calculator 19 and the second correlation value calculator 20, in the radar receiver Rx1. The correlation value peak detector 23 calculates the square value $(|AC_1(k)|^2)$ of the received first correlation value $AC_1(k)$ at a discrete time after the discrete time $k_{s1}$. In addition, the correlation value peak detector 23 calculates the square value ($|AC_2(k)|^2$) of the received second correlation value $AC_2(k)$ at a discrete time after the discrete time $k_{s2}$.

The correlation value peak detector 23 detects the peak time $k_{p1}$ of the square value $|AC_1(k)|^2$ of the first correlation value $AC_1(k)$ more than a predetermined reference level Pth (see the ninth stage of FIG. 6). In addition, the correlation value peak detector 23 detects the peak time $k_{p2}$ of the square value $|AC_2(k)|^2$ of the second correlation value $AC_2(k)$ more than the predetermined reference level Pth (see the eleventh stage of FIG. 6). The correlation value peak detector 23 outputs the detected peak times $k_{p1}$ and $k_{p2}$ to the arrival delay time calculator 24.

As shown in the ninth stage of FIG. 6, the first correlation value $AC_1(k)$, which is the output from the first correlation value calculator 19, is an auto-correlation value between the output signal (see the seventh stage of FIG. 6) from the A/D converter 16 and the output signal (see the eighth stage of FIG. 6) from the first delay section 17. Therefore, the first correlation value $AC_1(k)$ increases as the period for which the time correlation between the output signal from the A/D converter 16 and the output signal from the first delay section 17 is high elapses, is a peak when the signal is output from the A/D converter 16 $N_{r1}$ times, and is gradually reduced because the period for which the time correlation is high ends.

In the example shown in FIG. 6, the square value $|AC_1(k)|^2$ and the square value $|AC_2(k)|^2$ are more than the reference level Pth.

The arrival delay time calculator 24 receives the discrete times $k_{s1}$ and $k_{s2}$ output from the transmission time detector 22 and the peak times $k_{p1}$ and $k_{p2}$ output from the correlation value peak detector 23. The arrival delay time calculator 24 calculates arrival delay times $T_{d1}$ and $T_{d2}$ from the transmission times of the radar transmission signals S-Tx1 and S-Tx2 to the arrival times of the reflected wave signals according to Expression (16), based on the received discrete times ($k_{s1}$ and $k_{s2}$) and the peak times ($k_{p1}$ and $k_{p2}$). The arrival delay time calculator 24 outputs the calculated arrival delay times $T_{d1}$ and $T_{d2}$ to the target distance calculator 25.

[Expression 16]

$$T_{d1}=k_{p1}-N_{r1}-k_{s1} \quad T_{d2}=k_{p2}-N_{r2}-k_{s2} \tag{16}$$

The target distance calculator 25 receives the arrival delay times $T_{d1}$ and $T_{d2}$ output from the arrival delay time calculator 24. The target distance calculator 25 calculates distances R1 and R2 from the position of the radar device 1 to the target based on the received arrival delay times $T_{d1}$ and $T_{d2}$ according to Expression (17). The target distance calculator 25 outputs the calculated distances R1 and R2 to the target position estimater 26. In addition, a parameter c0 is the speed of light.

[Expression 17]

$$R_1=c_0T_{d1}/2 \quad R_2=c_0T_{d2}/2 \tag{17}$$

The target position estimater 26 receives the distances output from the target distance calculator 25 of the target distance estimater D1 and the target distance calculator 25b of the target distance estimater D2. The target position estimater 26 calculates the position of the target based on the received distances, the position of the transmission antennas of the radar transmitters Tx1 and Tx2 and the position of the reception antennas of the radar receivers Rx1 and Rx2.

In the estimation and calculation of the position of the target by the target position estimater 26, the position of the target is measured based on the principle of multi-point positioning or trilateration using the position of each of the reception antennas AN-Rx1 and AN-Rx2 and the measurement results of the distances R1 and R2 by the positioning section 21. The measurement results of the distances R1 and R2 by the positioning section 21 are values which are obtained based on the reception results of the radar receivers Rx1 and Rx2. When two reception antennas are provided, it is possible to estimate the position of the target on the same plane.

As described above, in the radar device 1, a plurality of radar transmitters (Tx1 and Tx2) do not perform transmission in synchronization with each other and each radar transmitter and each radar receiver operate asynchronously. A process of measuring the position of the target can be performed for the following reasons.

When the correlation value calculators of the radar receivers Rx1 and Rx2 calculate the auto-correlation value according to Expression (10) and Expression (12), a frequency difference $\Delta f_{nm}$ between an n-th radar transmitter Txn and an m-th radar receiver Rxm is detected as a phase component $\Delta \theta_{nm}$ of the n-th correlation value of the m-th radar receiver Rxm. The n-th correlation value is the result calculated by an n-th correlation value calculator of the m-th radar receiver Rxm.

In this embodiment, the parameter n of the radar transmitter Txn is 1 or 2 and the parameter m of the radar receiver Rxm is 1 or 2. The frequency difference $\Delta f_{nm}$ is represented by Expression (18) and the phase component $\Delta \theta_{nm}$ is represented by Expression (19). A parameter $f_{Tn}$ indicates the carrier frequency of the n-th radar transmitter Txn, a parameter $f_{Rm}$ indicates the carrier frequency of the m-th radar receiver Rxm, and $\phi_0$ indicates an initial phase.

[Expression 18]

$$\Delta f_{nm}=|f_{Tn}-f_{Rm}| \tag{18}$$

[Expression 19]

$$\Delta \theta_{nm}=2\pi(f_{Tn}-f_{Rm})T_{pn}+\phi_0 \tag{19}$$

As described above, in this embodiment, the correlation value peak detectors 23 and 23b of the positioning section 21 detect the peak of the n-th correlation value using the square value of the n-th correlation value calculated by the n-th correlation value calculator of the m-th radar receiver Rxm. Therefore, the positioning section 21 can perform the process of measuring the position of the target, without being affected by the phase component $\Delta\theta_{nm}$ of the n-th correlation value, that is, even when the transmission operations of a plurality of radar transmitters Txn are not synchronized with each other and each radar transmitter Txn and each radar receiver Rxm do not operate in synchronization.

According to the radar device 1, since the operations of a plurality of radar transmitters do not need to be synchronized with each other, it is possible to improve flexibility in the installation of each radar transmitter. Similarly, according to the radar device 1, since the operations of each radar transmitter and each radar receiver do not need to be synchronized with each other, it is possible to improve flexibility in the installation of each radar transmitter and each radar receiver.

Since the operations of a plurality of radar transmitters Txq do not need to be synchronized with each other, a special circuit only for the radar device is not needed and a general-purpose RF module for wireless communication can be used in a plurality of radar transmitters Txn in the radar device 1. Therefore, it is possible to achieve the radar device 1 with a simple structure, without adding a circuit structure for synchronizing the operations of the transmission-side systems.

In this embodiment, the radar transmission signal from each radar transmitter has been described using the same pulse code sequences $a_{n\_p1}$ and $a_{n\_p2}$. However, the invention is not limited thereto. The radar transmission signal may be transmitted using different pulse code sequences as long as the pulse code sequences have the same code length. For example, code sequences which are orthogonal to each other and have the same code length may be used to transmit the radar transmission signal.

In this embodiment, the pulse compression code is used as the radar transmission signal. However, the invention is not limited thereto. For example, instead of the pulse signal, a frequency modulated signal or a frequency sweep signal may be used as the radar transmission signal. In this case, the radar transmission signal is repeatedly transmitted at a predetermined time interval $T_p$ to obtain the same effect as that of this embodiment.

(Modification 1 of First Embodiment)

In Modification 1 of the first embodiment, a radar device transmits the radar transmission signal a predetermined number of times in a predetermined cycle and adds a reflected wave signal of the transmitted radar transmission signal from the target the predetermined number of times.

Figure 7:
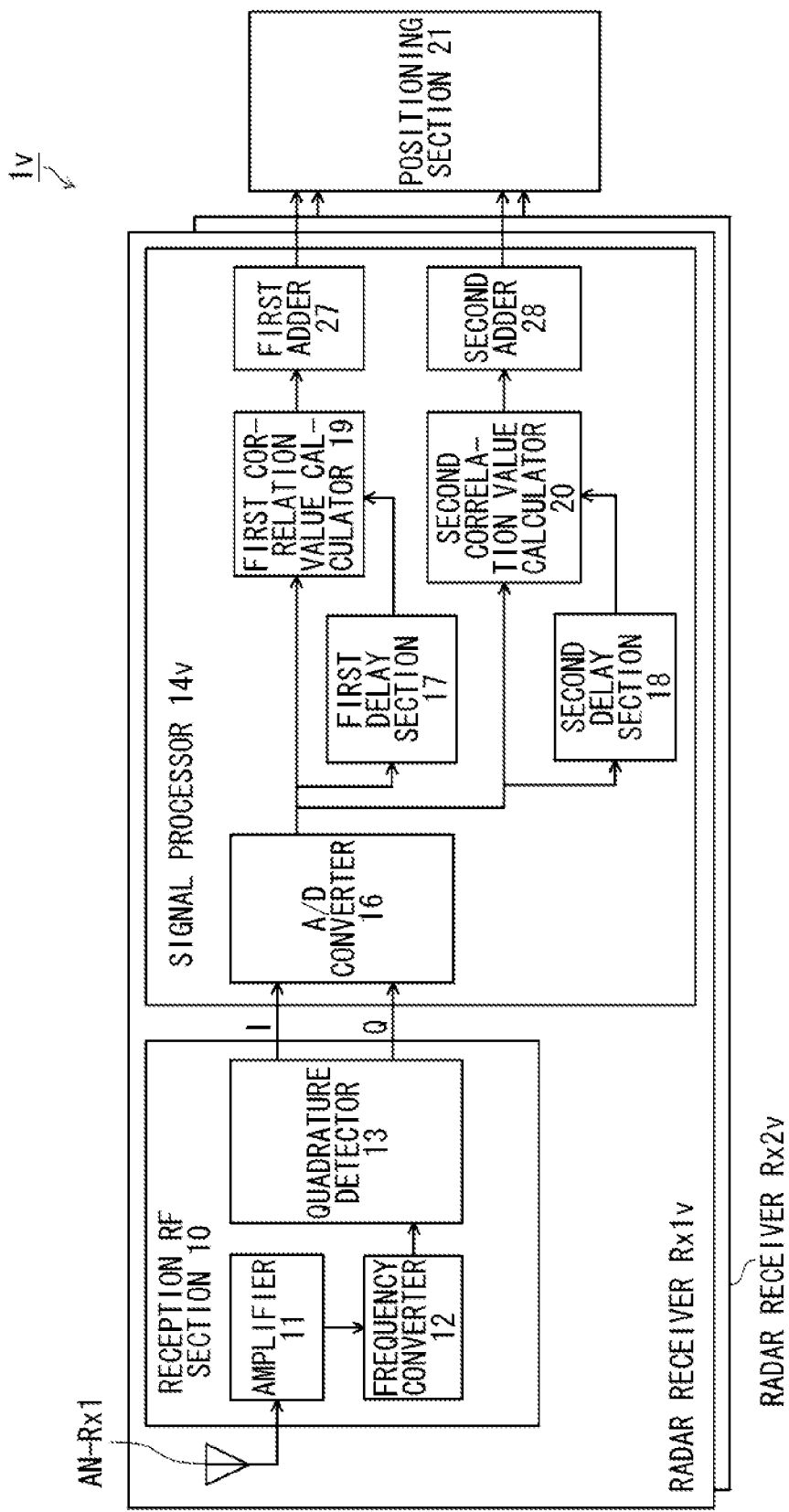
FIG. 7 is a block diagram illustrating in detail the internal structure of a radar receiver of a radar device according to Modification 1 of the first embodiment.
Figure 8:
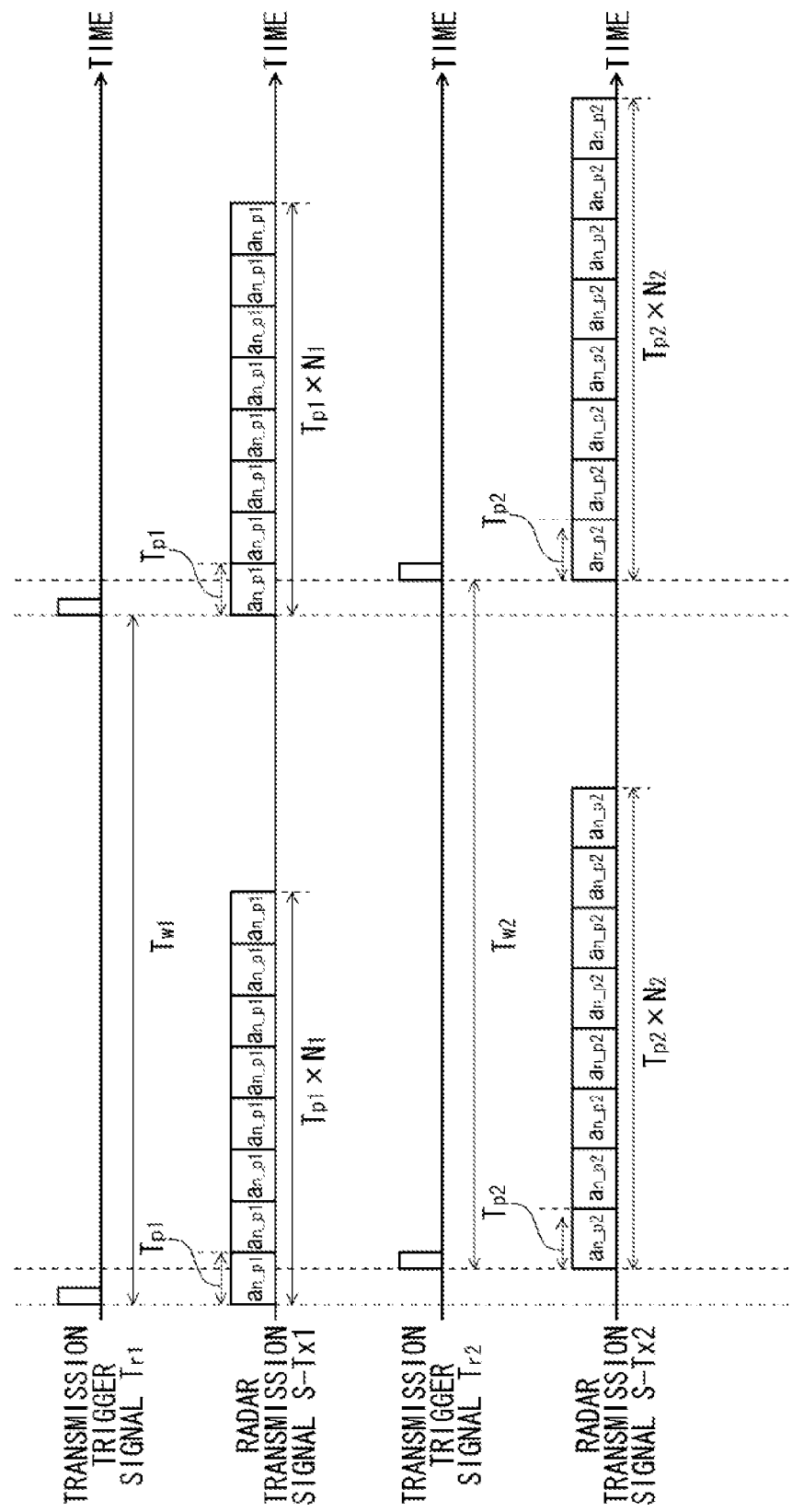
FIG. 8 is a timing chart illustrating an example of the relationship between each transmission trigger signal and each radar transmission signal in Modification 1 of the first embodiment.

The structure and operation of a radar device $1v$ according to Modification 1 of the first embodiment will be described with reference to FIGS. 7 and 8. FIG. 7 is a block diagram illustrating in detail the internal structure of radar receivers Rx1$v$ and Rx2$v$ of the radar device $1v$ according to Modification 1 of the first embodiment. FIG. 8 is a timing chart illustrating an example of the relationship between each transmission trigger signal and each radar transmission signal in Modification 1 of the first embodiment.

The structure of the radar device $1v$ will be described.

In the radar device $1v$ shown in FIG. 7, since the internal structure of the radar transmitter is the same as that of the radar transmitter of the radar device 1 shown in FIG. 1, the illustration thereof is omitted.

The radar receiver Rx1$v$ shown in FIG. 7 includes a first adder 27 and a second adder 28 in addition to the components of the radar receiver Rx1 shown in FIG. 1. Similarly, the radar receiver Rx2$v$ includes a first adder and a second adder in addition to the components of the radar receiver Rx2 shown in FIG. 1.

Next, in the operation of the radar device $1v$, the description of the same content as that of the operation of the radar device 1 according to the first embodiment will be omitted and content different from that of the operation of the radar device 1 according to the first embodiment will be described.

In Modification 1 of the first embodiment, the transmission controller 2 of the radar transmitter Tx1 outputs the transmission trigger signal $T_{r1}$ to the first code generator 4 in every first radar transmission cycle $T_{w1}$ (see FIG. 8). The radar transmitter Tx1 repeatedly transmits the radar transmission signal S-Tx1 in every first radar transmission cycle $T_{w1}$ (see FIG. 8).

Similarly, the transmission controller 2$b$ of the radar transmitter Tx2 outputs the transmission trigger signal $T_{r2}$ to the second code generator 4$b$ in every second radar transmission cycle $T_{w2}$ (see FIG. 8). The radar transmitter Tx2 repeatedly transmits the radar transmission signal S-Tx2 in every second radar transmission cycle $T_{w2}$ (see FIG. 8). Parameters $T_{w1}$ and $T_{w2}$ satisfy Expression (20) and Expression (21), respectively.

[Expression 20]
$$T_{w1} \geq T_{p1} \times N_1 \qquad (20)$$

[Expression 21]
$$T_{w2} \geq T_{p2} \times N_2 \qquad (21)$$

The first adder 27 receives $N_a$ first correlation values $AC_1(k)$ output from the first correlation value calculator 19.

The $N_a$ first correlation values $AC_1(k)$ are auto-correlation values which are calculated by the first correlation value calculator 19 based on the reflected wave signal of the radar transmission signal which is transmitted $N_a$ times by the radar transmitter of the radar device $1v$ and a delay signal obtained by delaying the reflected wave signal in the first delay section 17.

The first adder 27 adds the $N_a$ auto-correlation values according to Expression (22) or Expression (23) based on the received $N_a$ first correlation values $AC_1(k)$. The first adder 27 outputs the addition result ave_$AC_1(k, M)$ to the positioning section 21. A parameter $AC_1(k, M)$ is a first correlation value at a discrete time k with respect to an M-th radar transmission signal which is transmitted in a first radar transmission cycle. A parameter $N_a$ is a natural number equal to or greater than 2 and is the number of times the auto-correlation value is added by the first adder 27.

[Expression 22]
$$\text{ave\_}AC_1(k, s) = \left| \sum_{M=N_a(s-1)+1}^{N_a s} AC_1(k, M) \right|^2 \qquad (22)$$

[Expression 23]
$$\text{ave\_}AC_1(k, s) = \sum_{M=N_a(s-1)+1}^{N_a s} |AC_1(k, M)|^2 \qquad (23)$$

The second adder 28 receives $N_a$ second correlation values $AC_2(k)$ output from the second correlation value calculator 20. The $N_a$ second correlation values $AC_2(k)$ are auto-correlation values which are calculated by the second correlation value calculator 20 based on the reflected wave signal of the radar transmission signal which is transmitted $N_a$ times by the radar transmitter of the radar device $1v$ and a delay signal obtained by delaying the reflected wave signal in the second delay section 18.

The second adder 28 adds the $N_a$ auto-correlation values according to Expression (24) or Expression (25) based on the received $N_a$ second correlation values $AC_2(k)$. The second adder 28 outputs the addition result ave_$AC_2(k, M)$ to the positioning section 21. A parameter $AC_2(k, M)$ is a second correlation value at the discrete time k with respect to the M-th radar transmission signal which is transmitted in the first radar transmission cycle. A parameter $N_a$ is a natural number equal to or greater than 2 and is the number of times the auto-correlation value is added by the second adder 28.

[Expression 24]
$$\text{ave\_}AC_2(k, s) = \left| \sum_{M=N_a(s-1)+1}^{N_a s} AC_2(k, M) \right|^2 \qquad (24)$$

[Expression 25]
$$\text{ave\_}AC_2(k, s) = \sum_{M=N_a(s-1)+1}^{N_a s} |AC_2(k, M)|^2 \qquad (25)$$

In the positioning section 21, the correlation value peak detector 23 receives the addition results ave_$AC_1(k, M)$ and ave_$AC_2(k, M)$ of the first adder 27 and the second adder 28 of the radar receiver Rx1. The correlation value peak detector 23 calculates the square value ($|\text{ave\_AC}_1(k, M)|^2$) of the received addition result ave_AC$_1$(k, M) at a discrete time after the discrete time k$_{s1}$. In addition, the correlation value peak detector 23 calculates the square value ($|\text{ave\_AC}_2(k, M)|^2$) of the received addition result ave_AC$_2$(k, M) at a discrete time after the discrete time k$_{s2}$.

The correlation value peak detector 23 detects the peak time k$_{p1}$ of the square value $|\text{ave\_AC}_1(k, M)|^2$ of the addition result ave_AC$_1$(k, M) more than a predetermined reference level Pth. In addition, the correlation value peak detector 23 detects the peak time k$_{p2}$ of the square value $|\text{ave\_AC}_2(k, M)|^2$ of the addition result ave_AC$_2$(k, M) more than the predetermined reference level Pth. The correlation value peak detector 23 outputs the detected peak times k$_{p1}$ and k$_{p2}$ to the arrival delay time calculator 24. Since the correlation value peak detector 23b has the same operation as the correlation value peak detector 23, the description of the operation of the correlation value peak detector 23b will be omitted.

As described above, the radar device 1v repeatedly transmits the radar transmission signal and adds the auto-correlation values between the reflected wave signals and the delay signals of N$_a$ radar transmission signals. Therefore, according to the radar device 1v, a noise component is suppressed and the reception signal-to-noise ratio (SNR) of the reflected wave signal from the target can be improved. In addition, the target positioning performance can be improved.

The structure which repeatedly transmits the radar transmission signal and adds the auto-correlation values between the reflected wave signals and the delay signals of N$_a$ radar transmission signals to improve the reception SNR can be similarly applied to other embodiments and can improve the positioning performance.

(Modification 2 of First Embodiment)

Figure 10:
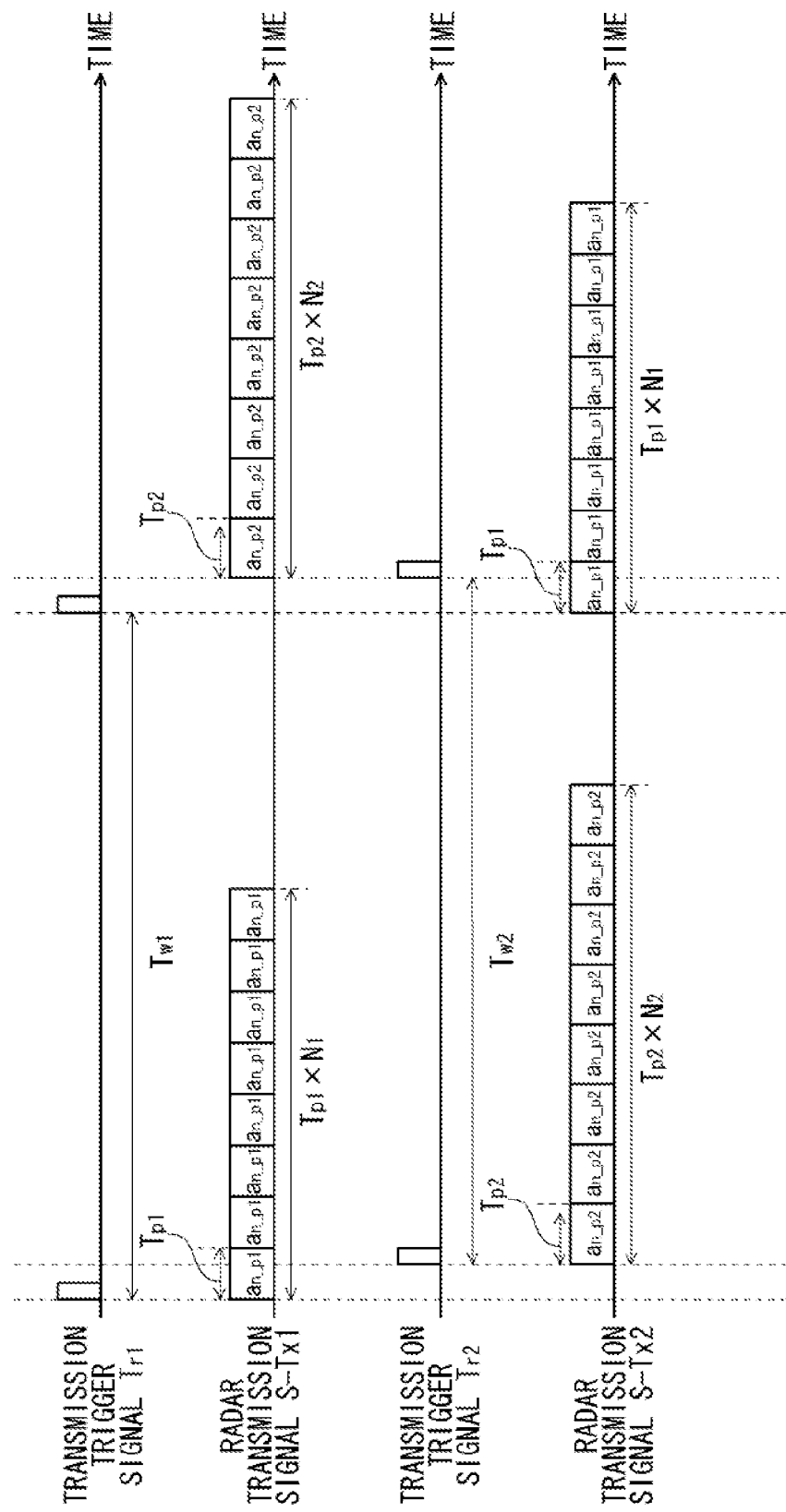
FIG. 10 is a timing chart illustrating the relationship between each transmission trigger signal and each radar transmission signal in Modification 2 of the first embodiment.

In Modification 2 of the first embodiment, when repeatedly transmitting a radar transmission signal a plurality of times, a radar device transmits the radar transmission signal while periodically changing a code sequence of transmission codes (see FIG. 10).

Figure 9:
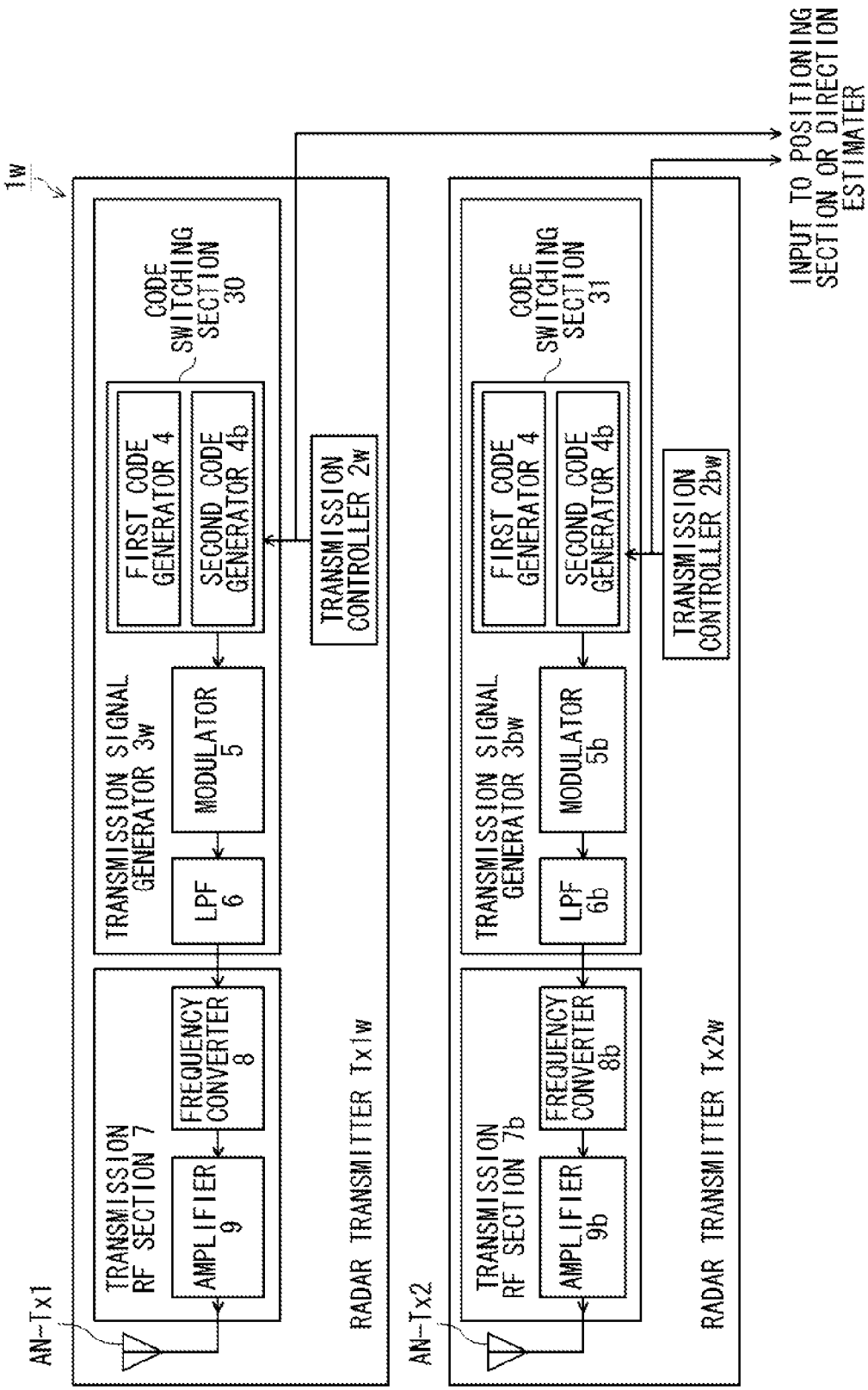
FIG. 9 is a block diagram illustrating in detail the internal structure of a radar transmitter of a radar device according to Modification 2 of the first embodiment.

The structure and operation of a radar device 1w according to Modification 2 of the first embodiment will be described with reference to FIGS. 9 and 10. FIG. 9 is a block diagram illustrating in detail the internal structure of radar transmitters Tx1w and Tx2w of the radar device 1w according to Modification 2 of the first embodiment. FIG. 10 is a timing chart illustrating the relationship between each transmission trigger signal and each radar transmission signal in Modification 2 of the first embodiment.

The structure of the radar device 1w will be described.

Figure 14:
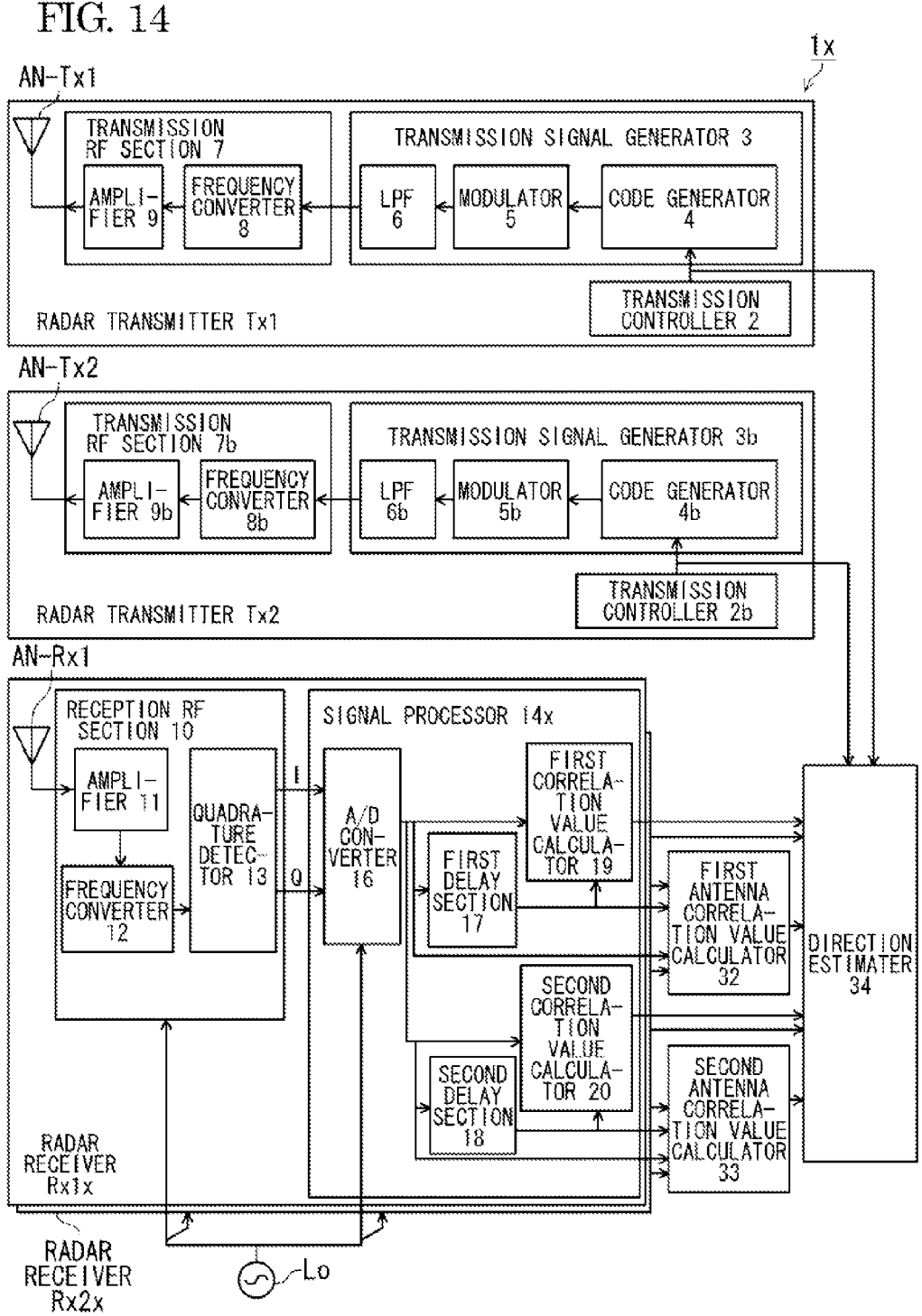
FIG. 14 is a block diagram illustrating in detail the internal structure of the radar device according to the second embodiment.

In the radar device 1w shown in FIG. 9, the internal structure of a radar receiver is the same as that of the radar receiver of the radar device 1v shown in FIG. 7 or a radar receiver of a radar device 1x shown in FIG. 14, which will be described below. In FIG. 9, the radar receiver of the radar device 1w is not shown.

The radar transmitter Tx1w shown in FIG. 9 includes a transmission controller 2w, a transmission signal generator 3w, and a transmission RF section 7 connected to a transmission antenna AN-Tx1. The transmission signal generator 3w includes a code switching section 30, a modulator 5, and an LPF 6. The code switching section 30 includes a first code generator 4 and a second code generator 4b.

The radar transmitter Tx2w shown in FIG. 9 includes a transmission controller 2bw, a transmission signal generator 3bw, and a transmission RF section 7b connected to a transmission antenna AN-Tx2. The transmission signal generator 3bw includes a code switching section 31, a modulator 5b, and an LPF 6b. The code switching section 31 includes a first code generator 4 and a second code generator 4b.

Next, the operation of the radar device 1w will be described. In the operation of the radar device 1w, the description of the same content as that of the operation of the radar device 1v according to Modification 1 of the first embodiment or a radar device 1x according to a second embodiment will be omitted, and content different from that of the operation of the radar device 1v according to Modification 1 of the first embodiment or the radar device 1x according to the second embodiment will be described.

In Modification 2 of the first embodiment, the transmission controller 2w of the radar transmitter Tx 1w outputs transmission trigger signals T$_{w1}$ or T$_{w2}$ to the code switching section 30 in a first radar transmission cycle T$_{r1}$ or a second radar transmission cycle T$_{r2}$.

The code switching section 30 selects the transmission code output from the first code generator 4 and outputs the selected transmission code to the modulator 5 based on the transmission trigger signal T$_{r1}$ in a (2z−1)-th transmission cycle, that is, a first radar transmission cycle T$_{w1}$. A parameter z is a natural number.

The code switching section 30 selects the transmission code output from the second code generator 4b and outputs the selected transmission code to the modulator 5 based on the transmission trigger signal T$_{r2}$ in a 2z-th transmission cycle, that is, a second radar transmission cycle T$_{w2}$.

In Modification 2 of the first embodiment, the transmission controller 2bw of the radar transmitter Tx2w outputs the transmission trigger signal T$_{r1}$ or T$_{r2}$ to the code switching section 31 in the first radar transmission cycle T$_{w1}$ or the second radar transmission cycle T$_{w2}$.

The code switching section 31 selects the transmission code output from the second code generator 4b and outputs the selected transmission code to the modulator 5b based on the transmission trigger signal T$_{r2}$ in the (2z−1)-th transmission cycle, that is, the second radar transmission cycle T$_{w2}$.

The code switching section 31 selects the transmission code output from the first code generator 4 and outputs the selected transmission code to the modulator 5b based on the transmission trigger signal T$_{r1}$ in the 2z-th transmission cycle, that is, the first radar transmission cycle T$_{w1}$.

As described above, when repeatedly transmitting the radar transmission signal a plurality of times, the radar device 1w transmits the radar transmission signal while periodically changing the code sequence of the transmission codes. Therefore, according to the radar device 1w, it is possible to obtain a transmission diversity effect and improve the accuracy of measuring the distance to the target even when transmission fading occurs in the reflected wave signal from the target.

(Modification 3 of First Embodiment)

In the radar device 1 according to the first embodiment, the radar transmitters transmit the pulse compression codes (transmission signals) having the same code length in different pulse widths. In a radar device according to Modification 3 of the first embodiment, radar transmitters transmit pulse compression codes (transmission signals) having different code lengths in the same pulse width.

In Modification 3 of the first embodiment, the structure of the radar device is the same as that of the radar device 1 according to the first embodiment, but the operation of each section is different from that of each section in the radar device 1 according to the first embodiment. For simplicity of explanation, in Modification 3 of the first embodiment, the same sections as those of the radar device 1 according to the first embodiment are denoted by the same reference numerals.

Figure 11:
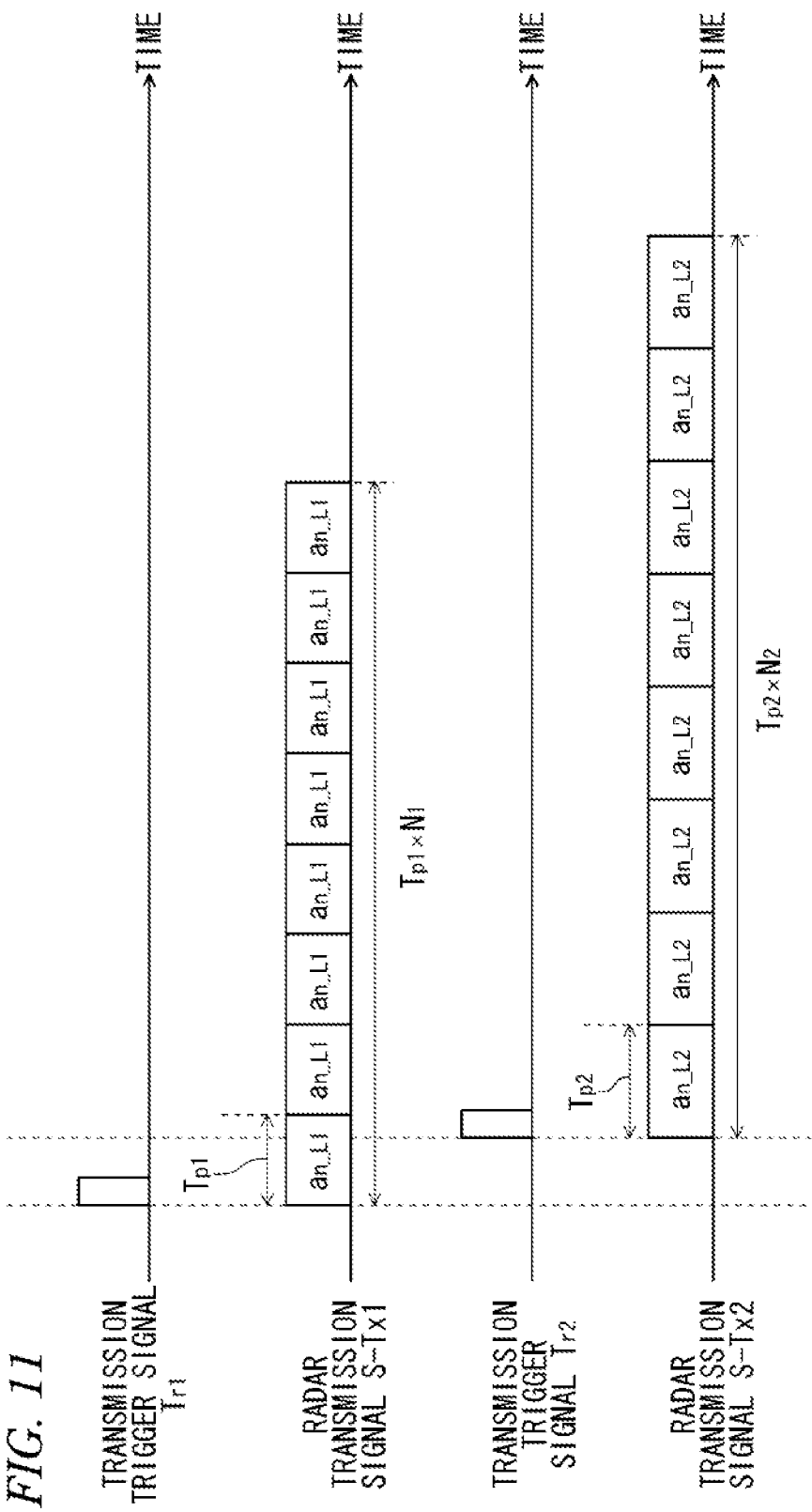
FIG. 11 is a timing chart illustrating an example of the relationship between each transmission trigger signal and each radar transmission signal in Modification 3 of the first embodiment.
Figure 12:
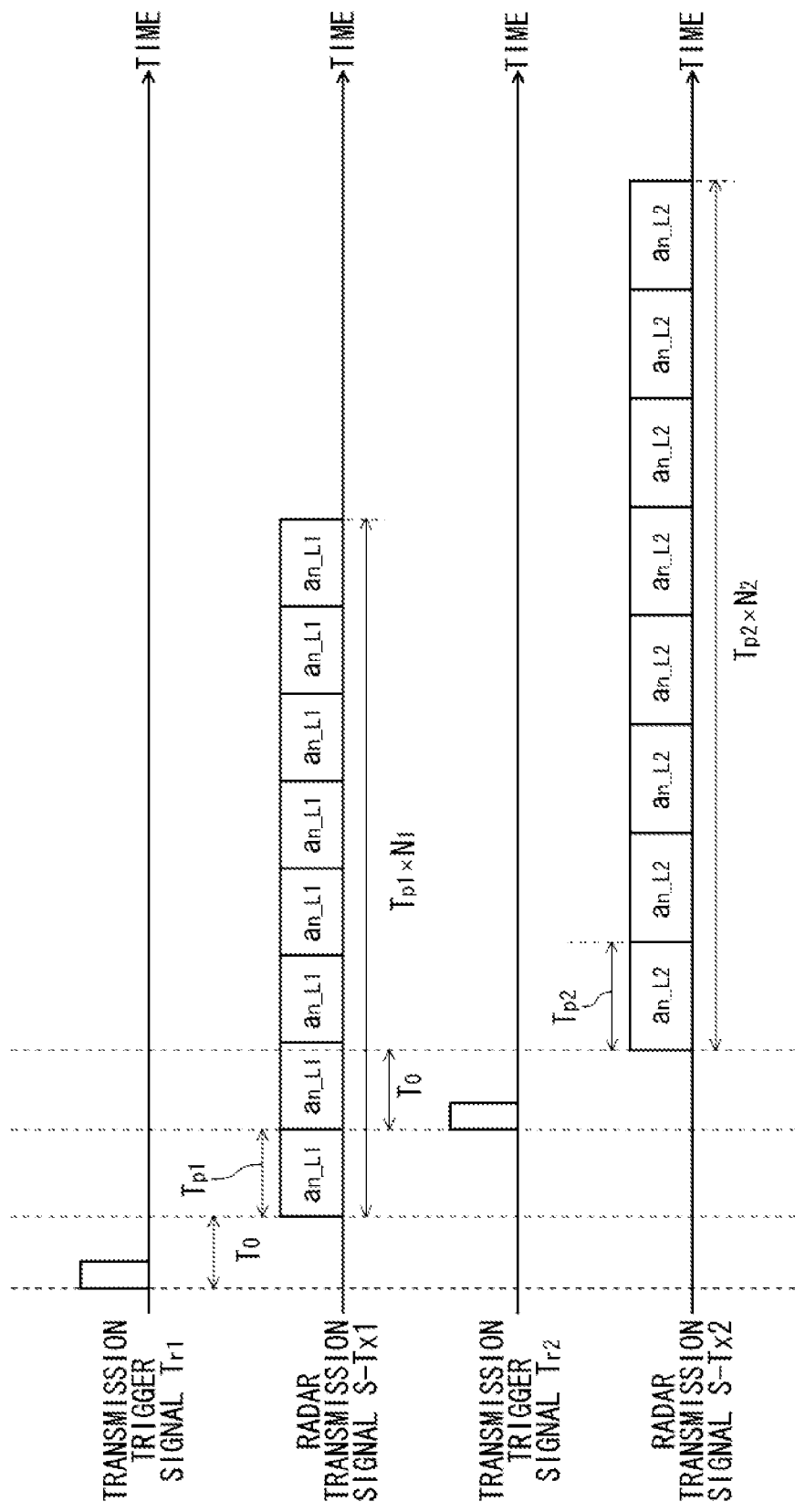
FIG. 12 is a timing chart illustrating another example of the relationship between each transmission trigger signal and each radar transmission signal in Modification 3 of the first embodiment.

The operation of each section of a radar device 1 according to Modification 3 of the first embodiment will be described with reference to FIGS. 11 and 12. FIG. 11 is a timing chart illustrating an example of the relationship between each transmission trigger signal and each radar transmission signal in Modification 3 of the first embodiment. FIG. 12 is a timing chart illustrating another example of the relationship between each transmission trigger signal and each radar transmission signal in Modification 3 of the first embodiment. In the operation of the radar device 1 according to Modification 3 of the first embodiment, the description of the same content as that of the operation of the radar device 1 according to the first embodiment will be omitted, and content different from that of the operation of the radar device 1 according to the first embodiment will be described.

The transmission signal generator 3 modulates a code sequence $b_{n1}$ with a code length $L_1$ based on a transmission trigger signal $T_{r1}$ (see the first stage of FIG. 11) from the transmission controller 2 to generate $N_1$ baseband pulse compression codes (transmission signals) $a_{n\_L1}$ (see the second stage of FIG. 11). A parameter $N_1$ is a predetermined integer, a parameter n_L1 is in the range of 1 to $L_1$, and a parameter $L_1$ indicates the code length of the code sequence $b_{n1}$.

The transmission RF section 7 converts the $N_1$ baseband pulse compression codes (transmission signals) $a_{n\_L1}$ generated by the transmission signal generator 3 into a radio-frequency radar transmission signal S-Tx1 and transmits the radio-frequency radar transmission signal S-Tx1 from the transmission antenna AN-Tx1.

The radar transmission signal S-Tx1 which is generated based on the pulse compression codes $a_{n\_L1}$ with the code length $L_1$ is transmitted for a transmission time with a pulse code width $T_{p1}$. That is, in the radar transmission signal S-Tx1 which is generated based on the pulse compression codes $a_{n\_L1}$ with the code length $L_1$, the pulse code width $T_{p1}$ is given to a pulse width $T_s$ per code by Expression (26). The radar transmission signal S-Tx1 which is repeatedly generated $N_1$ times based on the pulse compression codes $a_{n\_L1}$ with the code length $L_1$ is transmitted for a transmission time with a pulse code width $T_{p1} \times N_1$ (see the second stage of FIG. 11).

[Expression 26]

$$T_{P1} = L_1 \times T_S \quad (26)$$

In the second stage of FIG. 11, the radar transmission signal S-Tx1 is transmitted at the rising edge of the transmission trigger signal $T_{r1}$. However, for example, the radar transmission signal S-Tx1 may be transmitted at the falling edge of the transmission trigger signal $T_{r1}$.

In some cases, the radar transmission signal S-Tx1 is generated at the rising edge of the transmission trigger signal $T_{r1}$ and a time $T_o$ is required for the radar transmission signal S-Tx1 to be transmitted to a terminal portion of the transmission antenna AN-Tx1 (see the second stage of FIG. 12). In this case, the time $T_o$ required is measured in advance and is then subtracted from the calculation result of the positioning section 21, which will be described below. In this way, it is possible to reduce an error in the measurement of the distance to the target of the radar device 1.

The transmission signal generator 3b modulates the code sequence $b_{n2}$ with the code length $L_2$ based on the transmission trigger signal $T_{r2}$ (see the third stage of FIG. 11) from the transmission controller 2b to generate $N_2$ baseband pulse compression codes (transmission signals) $a_{n\_L2}$ (see the fourth stage of FIG. 11). A parameter $N_2$ is a predetermined integer, a parameter n_L2 is in the range of 1 to $L_2$, and a parameter $L_2$ indicates the code length of the code sequence $b_{n2}$.

The transmission RF section 7b converts the $N_2$ baseband pulse compression codes (transmission signals) $a_{n\_L2}$ generated by the transmission signal generator 3b into a radio-frequency radar transmission signal S-Tx2 and transmits the radio-frequency radar transmission signal S-Tx2 from the transmission antenna AN-Tx2.

The radar transmission signal S-Tx2 which is generated based on the pulse compression codes $a_{n\_L2}$ with the code length $L_2$ is transmitted for a transmission time with a pulse code width $T_{p2}$. That is, in the radar transmission signal S-Tx2 which is generated based on the pulse compression codes $a_{n\_L2}$ with the code length $L_2$, the pulse code width $T_{p2}$ is given to the pulse width $T_s$ per code by Expression (27). The radar transmission signal S-Tx2 which is repeatedly generated $N_2$ times based on the pulse compression codes $a_{n\_L2}$ with the code length $L_2$ is transmitted for a transmission time with a pulse code width $T_{p2} \times N_2$ (see the fourth stage of FIG. 11).

[Expression 27]

$$T_{P2} = L_2 \times T_{S1} \quad (27)$$

In the fourth stage of FIG. 11, the radar transmission signal S-Tx2 is transmitted at the rising edge of the transmission trigger signal $T_{r2}$. However, for example, the radar transmission signal S-Tx2 may be transmitted at the falling edge of the transmission trigger signal $T_{r2}$.

In some cases, the radar transmission signal S-Tx2 is generated at the rising edge of the transmission trigger signal $T_{r2}$ and a time $T_o$ is required for the radar transmission signal S-Tx2 to be transmitted to a terminal portion of the transmission antenna AN-Tx2 (see the fourth stage of FIG. 12). In this case, the time $T_o$ required is measured in advance and is then subtracted from the calculation result of the positioning section 21, which will be described below. In this way, it is possible to reduce an error in the measurement of the distance to the target of the radar device 1.

As shown in the second and fourth stages of FIG. 11, parameters $T_{p1}$ and $T_{p2}$ are different from each other, the parameter $T_{p1}$ is not an integer multiple of $T_{p2}$, and Expressions (28) and (29) are established between the parameters $T_{p1}$ and $T_{p2}$. In Expression (29), a parameter $T_{ad}$ indicates a sampling cycle in the A/D converter of the radar receiver.

Since Expression (29) is established, discrete sample delay numbers ($N_{s1}$ and $N_{s2}$) which are obtained by A/D conversion of different A/D converters of the radar receivers Rx1 and Rx2 are different from each other ($N_{s1} \neq N_{s2}$). That is, the radar receivers Rx1 and Rx2 can separate reflected wave signals obtained when the radar transmission signals S-Tx1 and S-Tx2 transmitted from the radar transmitters Tx1 and Tx2 are reflected from the target.

[Expression 28]

$$T_{P1} < T_{P2} \quad (28)$$

[Expression 29]

$$|T_{P2} - T_{P1}| \geq T_{ad} \quad (29)$$

According to the above-mentioned structure, the radar device according to Modification 3 of the first embodiment can have the same effect as the radar device 1 according to the first embodiment.

(Second Embodiment)

In a second embodiment, a radar device estimates an arrival direction of a reflected wave signal of a radar transmission signal from a target.

Figure 13:
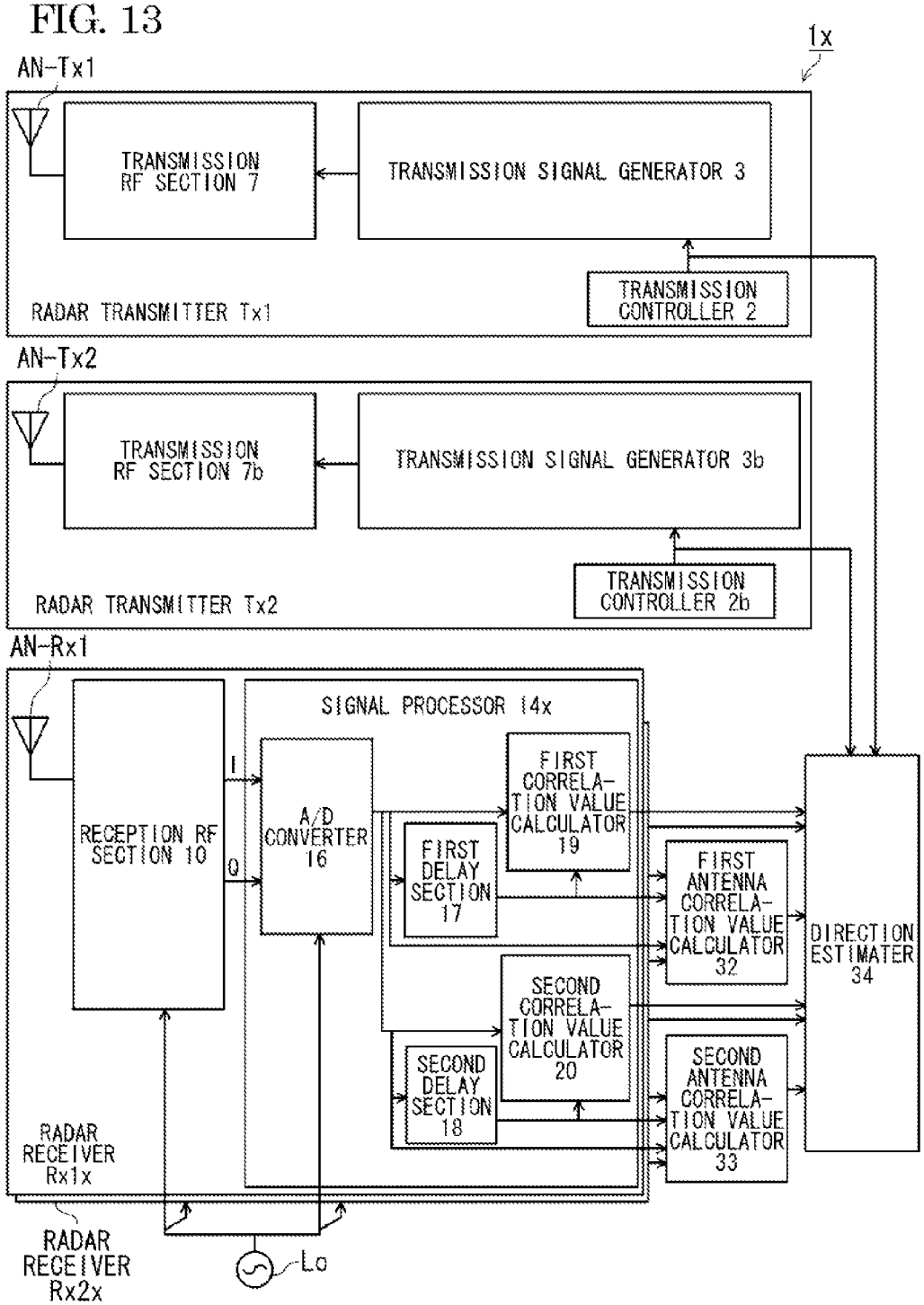
FIG. 13 is a block diagram illustrating briefly the internal structure of a radar device according to a second embodiment.
Figure 15:
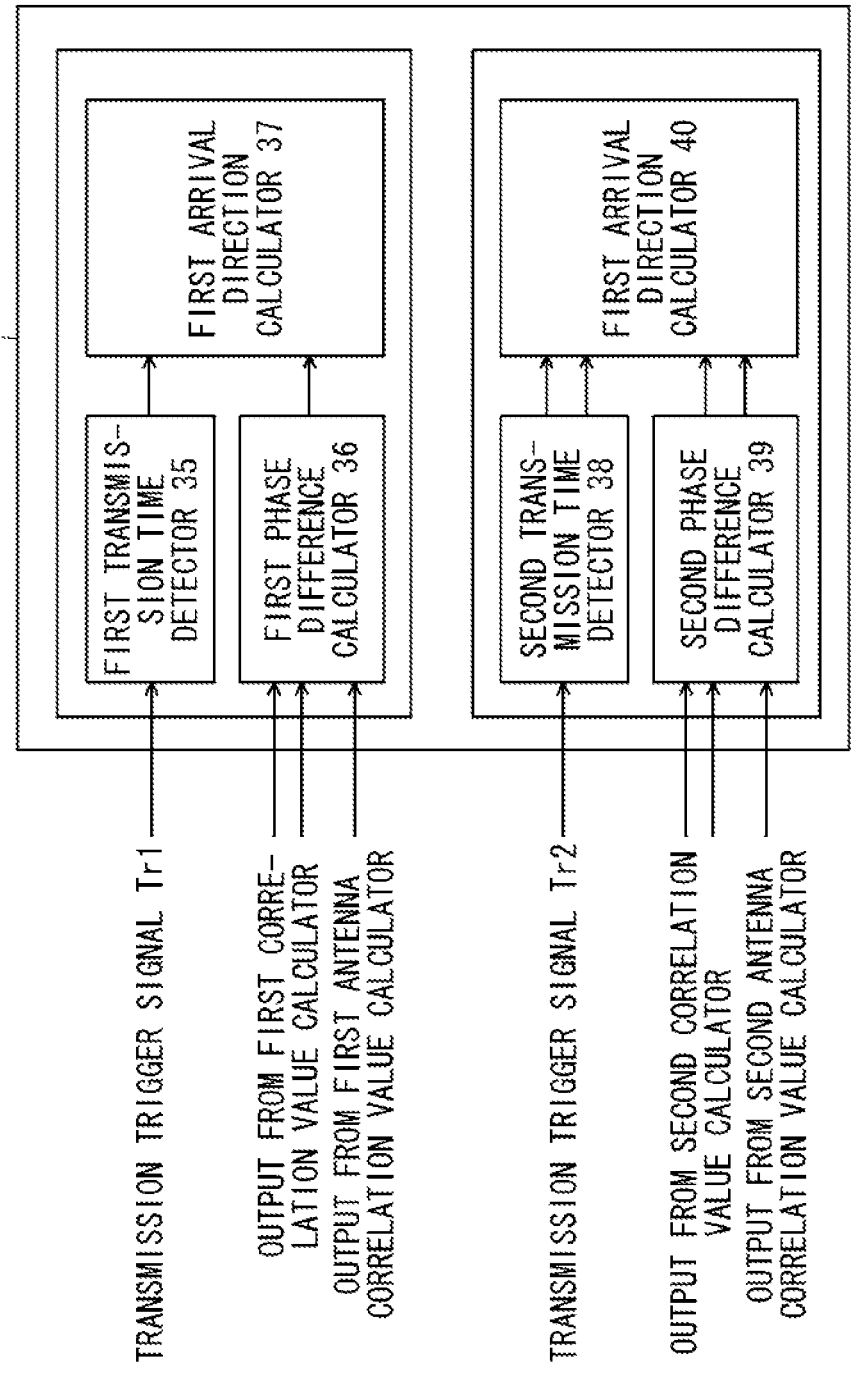
FIG. 15 is a block diagram illustrating in detail the internal structure of a direction estimater.
Figure 16:
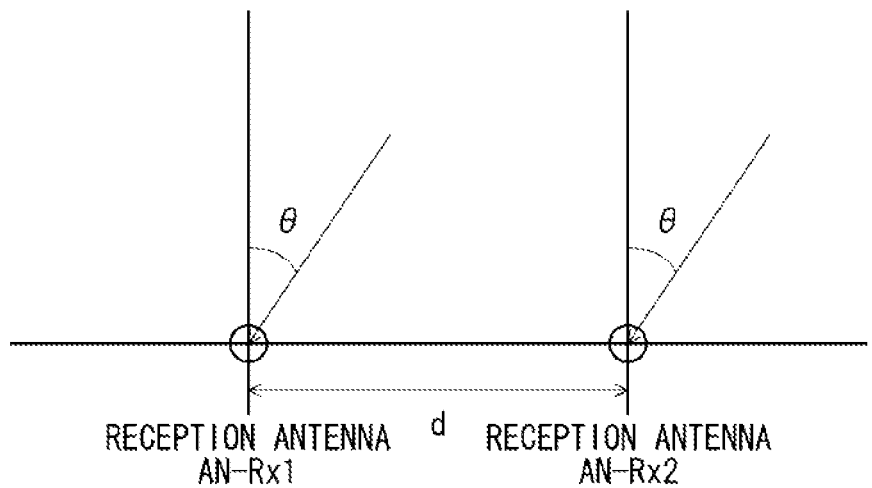
FIG. 16 is a diagram illustrating an example of the arrangement of reception antennas.

The structure and operation of a radar device 1x according to the second embodiment will be described with reference to FIGS. 13 to 16. FIG. 13 is a block diagram illustrating briefly the internal structure of the radar device 1x according to the second embodiment. FIG. 14 is a block diagram illustrating in detail the internal structure of the radar device 1x according to the second embodiment. FIG. 15 is a block diagram illustrating in detail the internal structure of a direction estimater 34. FIG. 16 is a diagram illustrating an example of the arrangement of reception antennas.

In the description of the structure and operation of the radar device 1x according to the second embodiment, the description of the same content as that in the radar device 1 according to the first embodiment will be omitted and different content will be described.

First, the structure of each section of the radar device 1x will be described briefly.

As shown in FIG. 13, the radar device 1x includes two radar transmitters Tx1 and Tx2, two radar receivers Rx1x and Rx2x, a first antenna correlation value calculator 32, a second antenna correlation value calculator 33, and a direction estimater 34. Since the structure and operation of the radar transmitters Tx1 and Tx2 are the same as those of the radar transmitters Tx1 and Tx2 of the radar device 1 according to the first embodiment, the description thereof will be omitted.

The radar receiver Rx1x includes a reception RF section 10 connected to a reception antenna AN-Rx1 and a signal processor 14x. The radar receiver Rx2x includes a reception RF section connected to a reception antenna and a signal processor. The signal processor 14x includes an A/D converter 16, a first delay section 17, a second delay section 18, a first correlation value calculator 19 and a second correlation value calculator 20. In addition, the radar receivers Rx1x and Rx2x have the same structure.

As shown in FIG. 13, a reference signal from a reference signal oscillator Lo is commonly input to the reception RF sections and the signal processors of the radar receivers Rx1x and Rx2x. Each section of the reception RF section and each section of the signal processor operate based on a signal obtained by multiplying the reference signal from the reference signal oscillator Lo by a predetermined value. Therefore, the operations of each section of the radar receivers Rx1x and Rx2x are synchronized with each other.

Next, a structure different from that of the radar device 1 according to the first embodiment, that is, the structure and operation of the first antenna correlation value calculator 32, the second antenna correlation value calculator 33, and the direction estimater 34 will be described in detail.

The first antenna correlation value calculator 32 receives reception signals x(k) and delay signals $x(k-N_{s1})$ output from the A/D converters and the first delay sections of the radar receivers Rx1x and Rx2x. The first antenna correlation value calculator 32 calculates first antenna correlation values $BC1_{21}(k)$ and $BC1_{12}(k)$ with respect to a radar transmission signal S-Tx1 according to Expression (30) and Expression (31) based on the reception signals x(k) and the delay signals $x(k-N_{s1})$. The first antenna correlation value calculator 32 outputs the calculated first antenna correlation values $BC1^{21}(k)$ and $BC1_{12}(k)$ to the direction estimater 34.

[Expression 30]
$$BC1_{21}(k) = \sum_{n=0}^{round[T_{p1}(N_1-1)/T_{ad}]-1} x_2(k+n)x_1(k+n-N_{s1})^* \quad (30)$$

[Expression 31]
$$BC2_{21}(k) = \sum_{n=0}^{round[T_{p1}(N_1-1)/T_{ad}]-1} x_2(k+n)x_1(k+n-N_{s1})^* \quad (32)$$

Here, $BC1_{nm}(k)$ is a first antenna correlation value at a discrete time k with respect to a reception signal $x_n(k)$ which is based on a delay signal $x_m(k-N_{s1})$ output from the first delay section of an m-th radar receiver Rxmx and is output from the A/D converter of an n-th radar receiver Rxnx. An asterisk (*) indicates a complex conjugate operator. In the second embodiment, a parameter n is 1 or 2 and a parameter m is 1 or 2.

The second antenna correlation value calculator 33 receives reception signals x(k) and delay signals $x(k-N_{s2})$ output from the A/D converters and the second delay sections of the radar receivers Rx1x and Rx2x. The second antenna correlation value calculator 33 calculates second antenna correlation value $BC2_{21}(k)$ and $BC2_{12}(k)$ with respect to a radar transmission signal S-Tx2 according to Expression (32) and Expression (33) based on the reception signals x(k) and the delay signals $x(k-N_{s2})$. The second antenna correlation value calculator 33 outputs the calculated second antenna correlation values $BC2_{21}(k)$ and $BC2_{12}(k)$ to the direction estimater 34.

[Expression 32]
$$BC2_{21}(k) = \sum_{n=0}^{round[T_{p1}(N_1-1)/T_{ad}]-1} x_2(k+n)x_1(k+n-N_{s1})^* \quad (32)$$

[Expression 33]
$$BC2_{12}(k) = \sum_{n=0}^{round[T_{p1}(N_1-1)/T_{ad}]-1} x_1(k+n)x_2(k+n-N_{s1})^* \quad (33)$$

Here, $BC2_{nm}(k)$ is a second antenna correlation value at the discrete time k with respect to the reception signal $x_n(k)$ which is based on a delay signal $x_m(k-N_{s2})$ output from the second delay section of the m-th radar receiver Rxmx and is output from the A/D converter of the n-th radar receiver Rxnx. An asterisk (*) indicates a complex conjugate operator.

In the following description, the output signal from the A/D converter of a u-th radar receiver is referred to as $x_u(k)$, the delay signal from the first delay section of the u-th radar receiver is referred to as $x_u(k-N_{s1})$, and the delay signal from the second delay section of the u-th radar receiver is referred to as $x_u(k-N_{s2})$. In addition, the first correlation value output from the u-th radar receiver is referred to as $AC1_u(k)$ and the second correlation value output from the u-th radar receiver is referred to as $AC2_u(k)$.

(Direction Estimater)

Next, the structure of each section of the direction estimater 34 will be described with reference to FIG. 15.

As shown in FIG. 1, the direction estimater 34 includes a first transmission time detector 35, a first phase difference calculator 36, a first arrival direction calculator 37, a second transmission time detector 38, a second phase difference calculator 39, and a second arrival direction calculator 40.

The operation of each section of the direction estimater 34 will be described in detail.

The first transmission time detector 35 receives the transmission trigger signal $T_{r1}$ output from the transmission controller 2 and detects the discrete time $k_{s1}$ of the transmission trigger signal $T_{r1}$ based on the received transmission trigger signal $T_{r1}$. The first transmission time detector 35 outputs the detected discrete time $k_{s1}$ to the first arrival direction calculator 37.

The first phase difference calculator 36 receives the first correlation values $AC1_1(k)$ and $AC1_2(k)$ output from the radar receivers Rx1x and Rx2x and the first antenna correlation values $BC1_{21}(k)$ and $BC1_{12}(k)$ output from the first antenna correlation value calculator 32. The first phase difference calculator 36 calculates a parameter $Z1(k)$ of Expression (34) at each discrete time k or the discrete time k at which $AC1(k)$ has a peak, based on the received correlation values ($AC1_1(k)$, $AC1_2(k)$, $BC1_{21}(k)$, and $BC1_{12}(k)$).

The first phase difference calculator 36 calculates a phase component $\Phi 1(k)$=angle[$Z1(k)$] of the parameter $Z1(k)$, which is a complex number, based on the calculated parameter $Z1(k)$. In addition, angle[$Z1(k)$] is an operator for calculating a phase component [rad] of the complex number $Z1(k)$. The first phase difference calculator 36 outputs the calculated phase component $\Phi 1(k)$ to the first arrival direction calculator 37.

[Expression 34]

$$Z1(k) = BC1_{21}(k)AC1_1^*(k) + BC1_{12}^*(k)AC1_2(k) \quad (34)$$

The first arrival direction calculator 37 receives the discrete time $k_{s1}$ output from the first transmission time detector 35 and the phase component $\Phi 1(k)$ output from the first phase difference calculator 36. The first arrival direction calculator 37 calculates the arrival direction of the reflected wave signal from the target based on the received phase component $\Phi 1(k)$. When the reception antennas of the radar receivers Rx1x and Rx2x are arranged at an interval d as shown in FIG. 16, the first arrival direction calculator 37 calculates the arrival direction $\phi$ of the reflected wave signal according to Expression (35).

[Expression 35]

$$\phi = \frac{2\pi d \sin\theta}{\lambda} \quad (35)$$

The first arrival direction calculator 37 may calculate an angle profile $AP(\theta)$ of Expression (37) using a correlation matrix $H1(k)$ of Expression (36) and calculate the arrival direction of the reflected wave signal using a parameter $\theta$ which gives the peak of the angle profile $AP(\theta)$. In this case, even when the signal received by each radar receiver includes a plurality of reflected wave signals, the first arrival direction calculator 37 detects a plurality of peaks in the angle profile $AP(\theta)$ to calculate the arrival direction of each reflected wave signal.

In Expression (38), $a(\theta_n)$ is a column vector that has elements corresponding to the number of reception antennas and includes phase difference information which is based on the reception antenna AN-Rx1 as the reference antenna and is generated due to the spatially different arrangement of the reception antenna when the reflected wave signal arrives in a $\theta n$ direction and is called an array manifold or a steering vector. Here, a parameter $\theta_n$ varies at each predetermined angle interval $\Delta\theta$ in a predetermined angle range to calculate the angle profile $AP(\theta_n)$ and the arrival direction of the reflected wave signal is calculated using the parameter $\theta$ which gives a peak.

[Expression 36]

$$H1(k) = \begin{pmatrix} AC1_1(k)AC1_1^*(k) & BC1_{21}(k)AC1_1^*(k) \\ BC1_{12}(k)AC1_2^*(k) & AC1_2(k)AC1_2^*(k) \end{pmatrix} \quad (36)$$

[Expression 37]

$$a(\theta_n) = \begin{pmatrix} 1 \\ \frac{2\pi d \sin\theta_n}{\lambda} \end{pmatrix} \quad (38)$$

[Expression 38]

$$a(\theta_n) = \begin{pmatrix} 1 \\ \frac{2\pi d \sin\theta_n}{\lambda} \end{pmatrix} \quad (38)$$

The second transmission time detector 38 receives the transmission trigger signal $T_{r2}$ output from the transmission controller 2b and detects the discrete time $k_{s2}$ of the transmission trigger signal $T_{r2}$ based on the received transmission trigger signal $T_{r2}$. The second transmission time detector 38 outputs the detected discrete time $k_{s2}$ to the second arrival direction calculator 40.

The second phase difference calculator 39 receives the second correlation values $AC2_1(k)$ and $AC2_2(k)$ output from the radar receivers Rx1x and Rx2x and the second antenna correlation values $BC2_{21}(k)$ and $BC2_{12}(k)$ output from the second antenna correlation value calculator 33. The second phase difference calculator 39 calculates $Z2(k)$ of Expression (39) at each discrete time k or the discrete time k at which $AC2(k)$ has a peak, based on the received correlation values ($AC2_1(k)$, $AC2_2(k)$, $BC2_{21}(k)$, and $BC2_{12}(k)$).

The second phase difference calculator 39 calculates a phase component $\Phi 2(k)$=angle[$Z2(k)$] of $Z2(k)$, which is a complex number, based on the calculated $Z2(k)$. In addition, angle[$Z2(k)$] is an operator for calculating a phase component [rad] of the complex number $Z2(k)$. The second phase difference calculator 39 outputs the calculated phase component $\Phi 2(k)$ to the second arrival direction calculator 40.

[Expression 39]

$$Z2(k) = BC2_{21}(k)AC2_1^*(k) + BC2_{12}^*(k)AC2_2(k) \quad (39)$$

The second arrival direction calculator 40 receives the discrete time $k_{s2}$ output from the second transmission time detector 38 and the phase component $\Phi 2(k)$ output from the second phase difference calculator 39. The second arrival direction calculator 40 calculates the arrival direction of the reflected wave signal from the target based on the received phase component $\Phi 2(k)$. When the reception antennas of the radar receivers Rx1x and Rx2x are arranged at the interval d as shown in FIG. 16, the second arrival direction calculator 40 calculates the arrival direction $\phi$ of the reflected wave signal according to Expression (40).

[Expression 40]

$$\phi = \frac{2\pi d \sin\theta}{\lambda} \quad (40)$$

The second arrival direction calculator 40 may calculate an angle profile AP(θ) of Expression (42) using a correlation matrix H2(k) of Expression (41) and calculate the arrival direction of the reflected wave signal using a parameter θ which gives the peak of the angle profile AP(θ). In this case, even when the signal received by each radar receiver includes a plurality of reflected wave signals, the second arrival direction calculator 40 detects a plurality of peaks in the angle profile AP(θ) to calculate the arrival direction of each reflected wave signal.

In Expression (43), a parameter a(θ$_n$) is a vector that includes phase difference information which is based on the reception antenna AN-Rx2 as the reference antenna and is generated due to the spatially different arrangement of the reception antenna when the reflected wave signal arrives in the θn direction and is called an array manifold or a steering vector. Here, a parameter θ$_n$ varies at each predetermined angle interval Δθ in a predetermined angle range to calculate the angle profile AP(θ$_n$) and the arrival direction of the reflected wave signal is calculated using the parameter θ which gives a peak.

[Expression 41]

$$H2(k) = \begin{pmatrix} AC2_1(k)AC2_1^*(k) & BC2_{21}(k)AC2_1^*(k) \\ BC2_{12}(k)AC2_2^*(k) & AC2_2(k)AC2_2^*(k) \end{pmatrix} \quad (41)$$

[Expression 42]

$$AP(\theta) = a^H(\theta_n)H2(k)a(\theta_n) \quad (42)$$

[Expression 43]

$$a(\theta_n) = \begin{pmatrix} 1 \\ \frac{2\pi d \sin\theta_n}{\lambda} \end{pmatrix} \quad (43)$$

According to the above-mentioned structure, in the radar device 1x, a plurality of radar transmitters (Tx1 and Tx2) do not perform transmission in synchronization with each other. However, it is possible to estimate the arrival direction of the reflected wave signal from the target for the following reasons.

When the correlation value calculators of the radar receivers Rx1x and Rx2x calculate the auto-correlation value according to Expression (10) and Expression (12), a carrier frequency difference Δf$_{nm}$ between an n-th radar transmitter Txn and an m-th radar receiver Rxmx is detected as a phase component Δθ$_{nm}$ of the n-th correlation value of the m-th radar receiver Rxmx. The n-th correlation value is the result calculated by an n-th correlation value calculator of the m-th radar receiver Rxmx.

In this embodiment, the parameter n of the n-th radar transmitter Txn is 1 or 2 and the parameter m of the m-th radar receiver Rxmx is 1 or 2. The carrier frequency difference Δf$_{nm}$ is represented by Expression (18) and the phase component Δθ$_{nm}$ is represented by Expression (19). A parameter f$_{Tn}$ indicates the carrier frequency of the n-th radar transmitter Txn and a parameter f$_{Rm}$ indicates the carrier frequency of the m-th radar receiver Rxm.

In the radar receivers Rx1x and Rx2x of the radar device 1x, since a reference signal from a reference signal oscillator Lo is commonly input, the reception RF sections operate in synchronization with each other. Therefore, the carrier frequency of each radar receiver can be commonly referred to as fR.

Therefore, the frequency difference Δf$_n$ (see Expression (44)) between the n-th radar transmitter Txn and the m-th radar receiver Rxmx is detected as the phase Δθ$_n$ (see Expression (45)) of the m-th correlation value in the m-th radar receiver Rxmx. Since the signal processors of the radar receivers operate in synchronization with each other, the A/D converters have the same sample time. That is, the discrete time k is common to the radar receivers. Therefore, the phase of the n-th antenna correlation value BCn$_{pq}$(k) calculated by the n-th antenna correlation value calculator is Δθ$_n$+φ$_{pq}$. Here, φ$_0$ is an initial phase.

[Expression 44]

$$\Delta f_n = |f_{Tn} - f_R| \quad (44)$$

[Expression 45]

$$\Delta\theta_n = 2\pi(f_{Tn} - f_R)T_{pn} + \phi_0 \quad (45)$$

A parameter φ$_{pq}$ indicates a reception phase difference of a p-th radar receiver Rxpx (p is 1 or 2) with respect to the reception phase of a q-th radar receiver Rxqx (q is 1 or 2). Since the reception RF sections and the signal processors of the radar receivers operate in synchronization with each other, the parameter φ$_{pq}$ can be regarded as a phase difference φ$_{pq}$ which is caused by a difference in arrangement between the reception antennas of the q-th radar receiver Rxqx and the p-th radar receiver Rxpx and depends on the arrival direction θ of the reflected wave.

An n-th phase difference detector of the direction estimater 34 detects the phase difference of the n-th antenna correlation value BCn$_{pq}$(k) with respect to the phase component (that is, Δθ$_n$) of a p-th correlation value ACn$_q$ using Expression (34) or Expression (39). Therefore, it is possible to detect the phase difference φ$_{pq}$ depending on the arrival direction θ of the reflected wave signal and estimate the arrival direction.

In a case in which the carrier frequency difference Δf$_q$ includes, for example, a variation due to the phase error of the frequency converter, when the carrier frequency difference Δf$_q$ is sufficiently less than T$_{p1}$ and T$_{p2}$ in the transmission time of the radar transmission signal, it is possible to estimate the direction based on phase detection even though the radar transmitters do not operate in synchronization with each other.

In this embodiment, the direction estimater estimates the distance to the target and the arrival direction of the reflected wave signal. However, when only the arrival direction is estimated, the first transmission time detector 35 and the second transmission time detector 38 may not be used. Therefore, it is possible to omit the operation of outputting the transmission trigger signals T$_{r1}$ and T$_{r2}$ from the radar receiver to the direction estimater 34.

(Third Embodiment)

In a third embodiment, a radar device uses a first radar transmission cycle and a second radar transmission cycle two or more times to estimate the Doppler phase shift of a reflected wave signal based on movement to a target.

Figure 17:
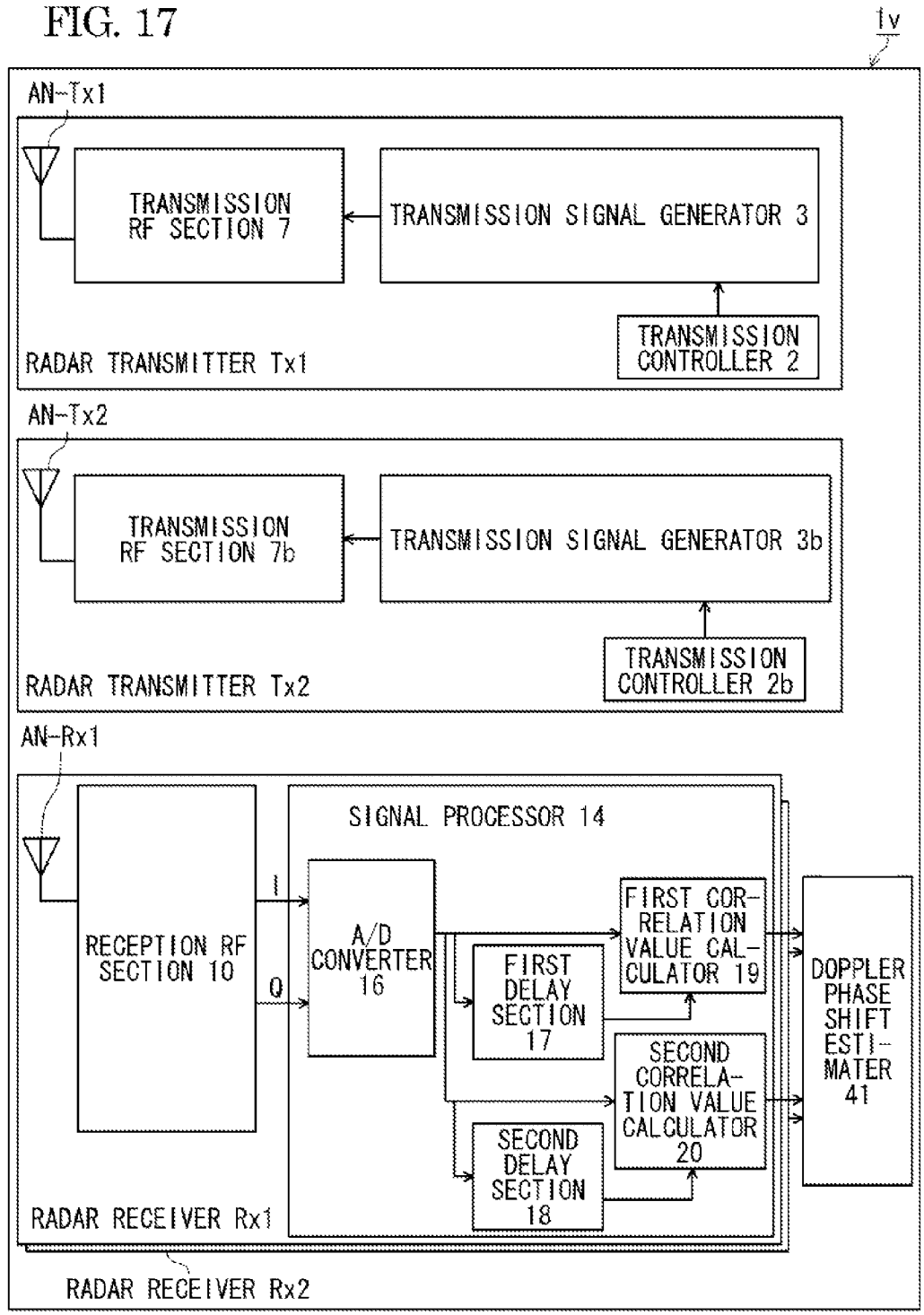
FIG. 17 is a block diagram illustrating briefly the internal structure of a radar device according to a third embodiment.
Figure 18:
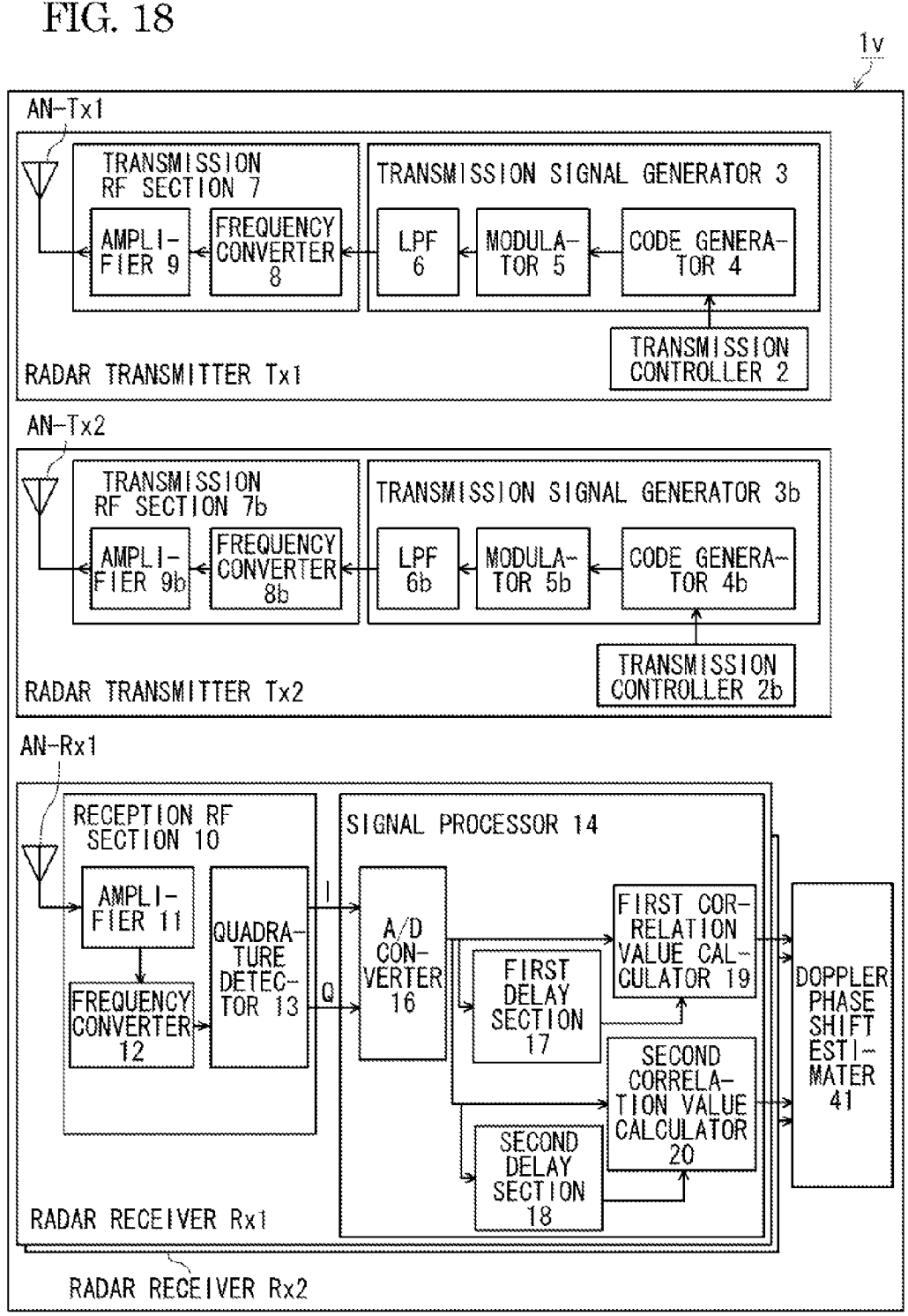
FIG. 18 is a block diagram illustrating in detail the internal structure of the radar device according to the third embodiment.
Figure 19:
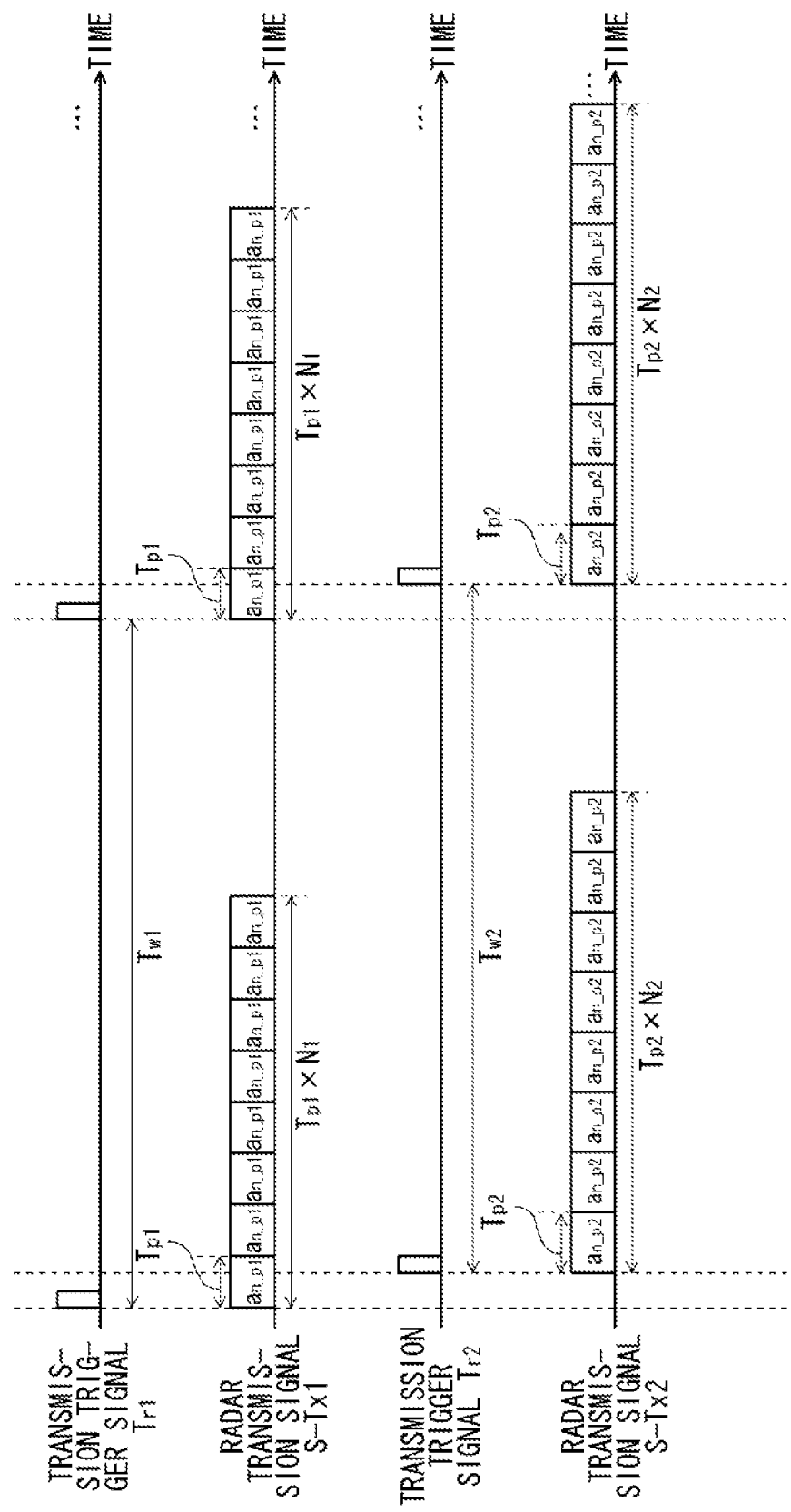
FIG. 19 is a timing chart illustrating an example of the relationship between each transmission trigger signal and each radar transmission signal in the third embodiment.
Figure 20:
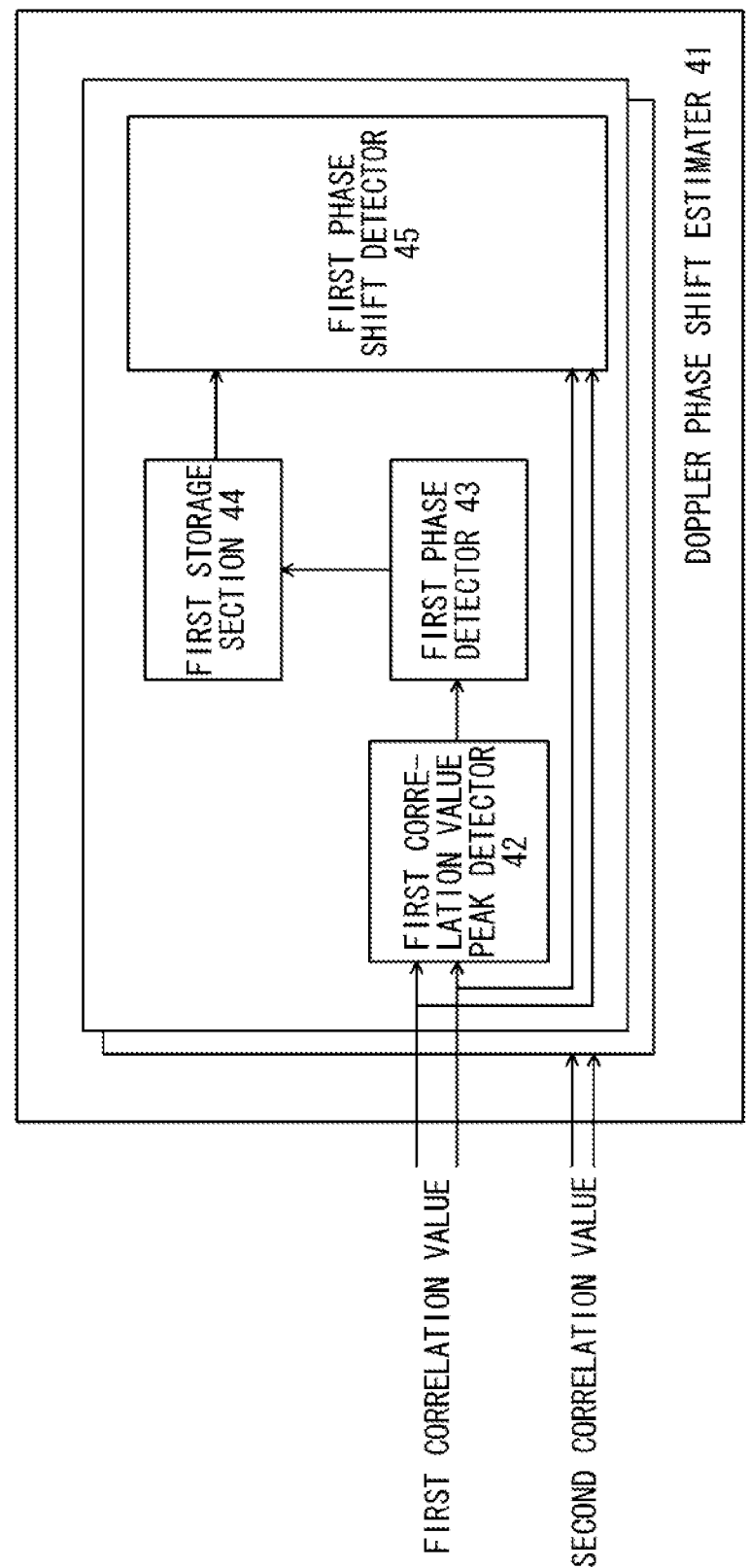
FIG. 20 is a block diagram illustrating in detail an example of the internal structure of a Doppler phase shift estimater.
Figure 21:
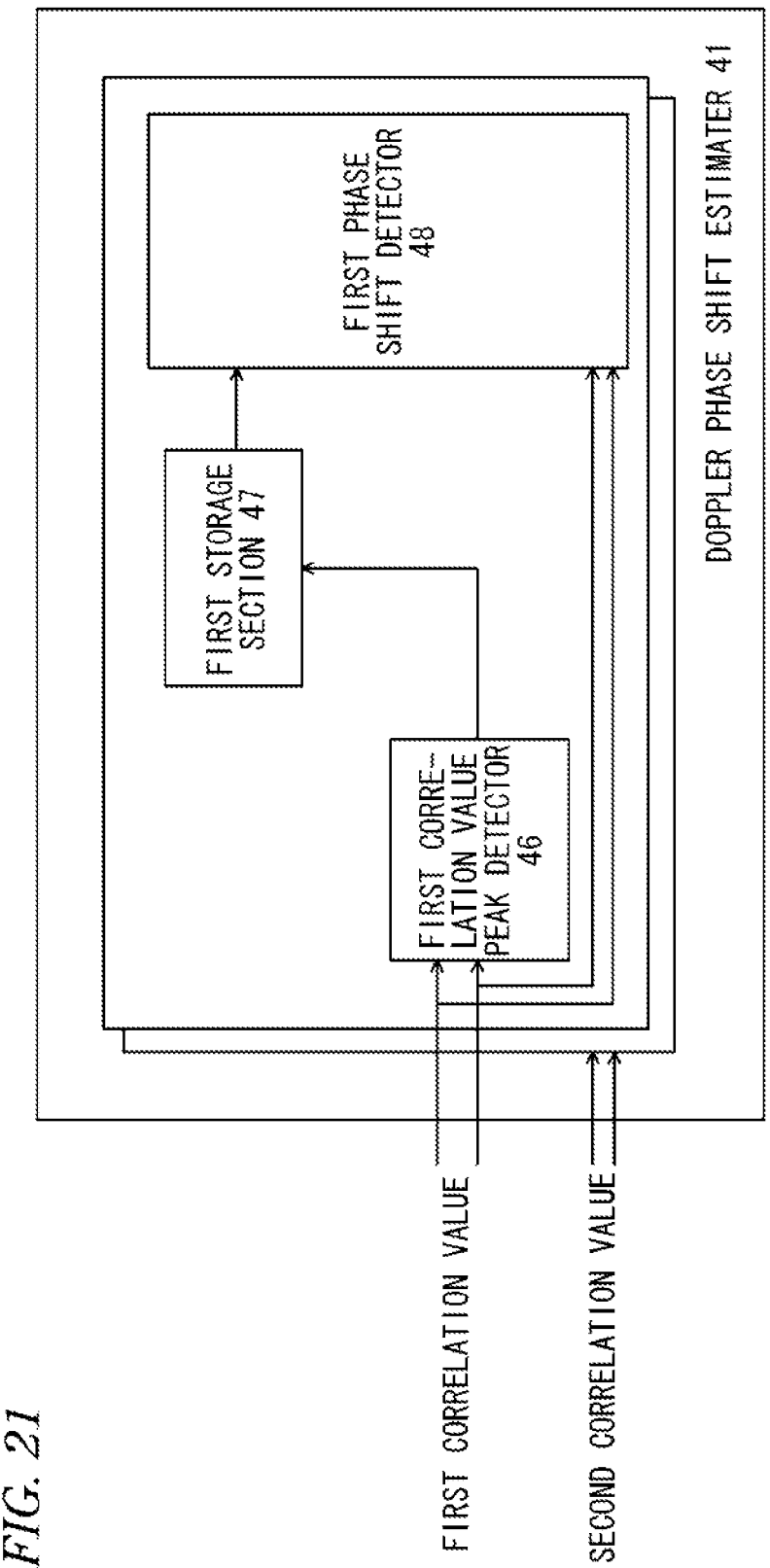
FIG. 21 is a block diagram illustrating in detail another example of the internal structure of the Doppler phase shift estimater.

The structure and operation of a radar device 1y according to the third embodiment will be described with reference to FIGS. 17 to 21. FIG. 17 is a block diagram illustrating briefly the internal structure of the radar device 1y according to the third embodiment. FIG. 18 is a block diagram illustrating in detail the internal structure of the radar device 1y according to the third embodiment. FIG. 19 is a timing chart illustrating an example of the relationship between each transmission trigger signal and each radar transmission signal in the third embodiment. FIG. 20 is a block diagram illustrating in detail an example of the internal structure of a Doppler phase shift estimater 41. FIG. 21 is a block diagram illustrating in detail another example of the internal structure of a Doppler phase shift estimater 41.

In the description of the structure and operation of the radar device 1y according to the third embodiment, the description of the same content as that in the radar device 1 according to the first embodiment will be omitted and different content will be described.

First, the structure of each section of the radar device 1y will be described briefly.

As shown in FIG. 17, the radar device 1y includes two radar transmitters Tx1 and Tx2, two radar receivers Rx1 and Rx2, and the Doppler phase shift estimater 41. Since the structure and operation of the radar transmitters Tx1 and Tx2 are the same as those of the radar transmitters Tx1 and Tx2 of the radar device 1 according to the first embodiment, the description thereof will be omitted. In addition, since the structure and operation of the radar receivers Rx1 and Rx2 are the same as those of the radar receivers Rx1 and Rx2 of the radar device 1 according to the first embodiment, the description thereof will be omitted.

In the third embodiment, a transmission controller 2 of the radar transmitter Tx1 outputs a transmission trigger signal $T_{r1}$ to a first code generator 4 in every first radar transmission cycle $T_{w1}$ (see FIG. 19). The radar transmitter Tx1 repeatedly transmits a radar transmission signal S-Tx1 in every first radar transmission cycle $T_{w1}$ (see FIG. 19).

Similarly, a transmission controller 2b of the radar transmitter Tx2 outputs a transmission trigger signal $T_{r2}$ to a second code generator 4b in every second radar transmission cycle $T_{w2}$ (see FIG. 19). The radar transmitter Tx2 repeatedly transmits a radar transmission signal S-Tx2 in every second radar transmission cycle $T_{w2}$ (see FIG. 19). Parameters $T_{w1}$ and $T_{w2}$ satisfy Expression (20) and Expression (21).

(Doppler Phase Shift Estimater)

Next, a structure different from that of the radar device 1 according to the first embodiment, that is, the structure and operation of the Doppler phase shift estimater 41 will be described with reference to FIG. 20. In the following description, a first correlation value at a discrete time k with respect to an M-th radar transmission signal is referred to as AC1(k, M) and a second correlation value at the discrete time k with respect to the M-th radar transmission signal is referred to as AC2(k, M).

As shown in FIG. 20, the Doppler phase shift estimater 41 estimates a Doppler phase shift based on the first correlation values AC1(k, M) output from the radar receivers Rx1 and Rx2. Specifically, the Doppler phase shift estimater 41 includes a first correlation value peak detector 42, a first phase detector 43, a first storage section 44, and a first phase shift detector 45.

In addition, the Doppler phase shift estimater 41 estimates the Doppler phase shift based on the second correlation values AC2(k, M) output from the radar receivers Rx1 and Rx2, which is not shown in FIG. 20. Specifically, the Doppler phase shift estimater 41 includes a second correlation value peak detector, a second phase detector, a second storage section, and a second phase shift detector.

The first correlation value peak detector 42 and the second correlation value peak detector have the same operation, the first phase detector 43 and the second phase detector have the same operation, the first storage section 44 and the second storage section have the same operation, and the first phase shift detector 45 and the second phase shift detector have the same operation. Therefore, in the following description of the Doppler phase shift estimater 41, the first correlation value peak detector 42, the first phase detector 43, the first storage section 44, and the first phase shift detector 45 will be described as an example.

In the following description, the first correlation value output from a u-th radar receiver Rxu which separates the M-th radar transmission signal transmitted in the first radar transmission cycle is referred to as $AC1_u(k, M)$. A parameter u is a natural number and is in the range of 1 to Nrx. A parameter Nrx is the number of radar receivers and is 2 in the radar device 1y (see FIG. 18) according to the third embodiment.

The first correlation value peak detector 42 receives the first correlation value $AC1_u(k, M)$ output from the u-th radar receiver Rxu. The first correlation value peak detector 42 calculates the square value $|AC1_u(k, M)|^2$ of the received first correlation value $AC1u(k, M)$. In addition, the first correlation value peak detector 42 detects the peak time $k_{p1}(u, M)$ of the square value $|AC1_u(k, M)|^2$ of the first correlation value $AC1_u(k)$ more than a predetermined reference level Pth. The first correlation value peak detector 42 outputs the detected peak time $k_{p1}(u, M)$ to the first phase detector 43.

The first phase detector 43 receives the peak time $k_{p1}(u, M)$ output from the first correlation value peak detector 42. The first phase detector 43 calculates a phase component $\Phi 1(k_{p1}(u), M)$ of the first correlation value $AC1_u(k_{p1}(u), M)$ at the peak time $k_{p1}(u, M)$ based on the received peak time $k_{p1}(u, M)$ according to Expression (46). The first phase detector 43 stores the calculated phase component $\Phi 1(k_{p1}(u), M)$ in the first storage section 44.

[Expression 46]

$$\Phi 1(k_{p1}(u), M) = \text{angle}[AC1_u(k_{p1}(u), M)] \quad (46)$$

The first storage section 44 temporarily stores the phase component $\Phi 1(k_{p1}(u), M)$ calculated by the first phase detector 43 and the discrete time $k_{p1}(u)$.

The first phase shift detector 45 detects the phase shift conditions of the reflected wave signal based on the movement of the target, based on the phase component $\Phi 1(k_{p1}(u), M)$ and the discrete time $k_{p1}(u)$ stored in the first storage section 44.

Specifically, the first phase shift detector 45 detects phase information $\Phi 1(k_{p1}(u)+\text{round}(T_{w1}/T_{p1}), M+1)$ of the first correlation value $AC1_u(k_{p1}(u)+\text{round}(T_{w1}/T_{p1}), M+1)$ at a discrete time $(k_{p1}(u)+\text{round}(T_{w1}/T_{p1}))$ in the next first radar transmission cycle $T_{w1}$, based on the discrete time $k_{p1}(u)$. In addition, the first phase shift detector 45 detects phase shift conditions $\Delta\Phi 1(k_{p1}(u), M)$ based on the difference (see Expression (47)) between the phase information $\Phi 1(k_{p1}(u)+\text{round}(T_{w1}/T_{p1}), M+1)$ and the temporarily stored phase information $\Phi 1(k_{p1}(u), M)$.

[Expression 47]

$$\Delta\Phi 1(k_{p1}(u), M) = \Phi 1(k_{p1}(u)+\text{round}(T_{w1}/T_{p1}), M+1) - \Phi 1(k_{p1}(u), M) \quad (47)$$

The first phase shift detector 45 can estimate the Doppler phase shift based on the movement of the target, using the calculation result of Expression (47) showing that a frequency variation increases as $\Delta\Phi 1(k_{p1}(u), M)$ increases.

As described above, in the radar device 1y, a plurality of radar transmitters (Tx1 and Tx2) do not perform transmission in synchronization with each other. However, the radar device 1y can estimate the Doppler phase shift included in the reflected wave signal for the following reasons.

When the correlation value calculators of the radar receivers Rx1 and Rx2 calculate the auto-correlation value according to Expression (10) and Expression (12), a carrier frequency difference $\Delta f_{nm}$ between an n-th radar transmitter Txn and an m-th radar receiver Rxm is detected as a phase component $\Delta \theta_{nm}$ of the n-th correlation value of the m-th radar receiver Rxm. The n-th correlation value is the result calculated by an n-th correlation value calculator.

In this embodiment, the parameter q of the radar transmitter Txn is 1 or 2 and the parameter m of the radar receiver Rxm is 1 or 2. The carrier frequency difference $\Delta f_{nm}$ is represented by Expression (18) and the phase component $\Delta \theta_{nm}$ is represented by Expression (48). A parameter $f_{Tn}$ indicates the carrier frequency of the radar transmitter Txn and a parameter $f_{Rm}$ indicates the carrier frequency of the radar receiver Rxm.

[Expression 48]

$$\Delta \theta_{nm} = 2\pi(f_{Tn} - f_{Rm})T_{pn} + 2\pi f_{dm} T_{pn} \quad (48)$$

In Expression 48, $f_{dm}$ indicates the Doppler frequency of the reflected wave signal received by the m-th radar receiver Rxm. An n-th phase shift detector of the Doppler phase shift estimater 41 detects the difference between the phase $\Delta\theta$nm of the first correlation value from the m-th radar receiver Rxm and the phase $\Delta\theta$nm of the first correlation value in the subsequent radar transmission cycle to estimate the Doppler phase shift.

In a case in which the carrier frequency difference $\Delta f$ includes, for example, a variation due to the phase error of the frequency converter, when the carrier frequency difference $\Delta f$ is sufficiently less than $T_{p1}$ and $T_{p2}$ in the transmission time of the radar transmission signal, it is possible to estimate the Doppler phase shift based on phase detection even though the radar transmitters do not operate in synchronization with each other.

Next, another structure and operation of the Doppler phase shift estimater 41 will be described with reference to FIG. 21.

As shown in FIG. 21, the Doppler phase shift estimater 41 estimates the Doppler phase shift based on the first correlation values AC1(k, M) output from the radar receivers Rx1 and Rx2. Specifically, the Doppler phase shift estimater 41 includes a first correlation value peak detector 46, a first storage section 47, and a first phase shift detector 48.

The Doppler phase shift estimater 41 estimates a Doppler phase shift based on the second correlation values AC2(k, M) output from the radar receivers Rx1 and Rx2, which is not shown in FIG. 21. Specifically, the Doppler phase shift estimater 41 includes a second correlation value peak detector, a second storage section, and a second phase shift detector.

The first correlation value peak detector 46 and the second correlation value peak detector have the same operation, the first storage section 47 and the second storage section have the same operation, and the first phase shift detector 48 and the second phase shift detector have the same operation. Therefore, in the following description of the Doppler phase shift estimater 41, the first correlation value peak detector 46, the first storage section 47, and the first phase shift detector 48 will be described as an example.

The first correlation value peak detector 46 receives a first correlation value $AC1_u(k, M)$ output from a u-th radar receiver Rxu. The first correlation value peak detector 46 calculates the square value $|AC1_u(k, M)|^2$ of the received first correlation value $AC1_u(k, M)$. In addition, the first correlation value peak detector 46 detects the peak time $k_{p1}(u, M)$ of the square value $|AC1_u(k, M)|^2$ of the received first correlation value $AC1_u(k, M)$ more than a predetermined reference level Pth. The first correlation value peak detector 46 outputs the detected peak time $k_{p1}(u, M)$ to the first storage section 47.

The first storage section 47 temporarily stores the peak time $k_{p1}(u, M)$ output from the first correlation value peak detector 46 and the first correlation value $AC1_u(k_{p1}(u), M)$ at the peak time $k_{p1}(u, M)$.

The first phase shift detector 48 detects the phase shift conditions of the reflected wave signal based on the movement of the target, based on the peak time $k_{p1}(u, M)$ and the first correlation value $AC1_u(k_{p1}(u), M)$ at the peak time $k_{p1}(u, M)$ which are stored in the first storage section 47.

Specifically, the first phase shift detector 48 detects the first correlation value $AC1_u(k_{p1}(u) + \text{round}(T_{w1}/T_{p1}), M+1)$ at a discrete time $(k_{p1}(u) + \text{round}(T_{w1}/T_{p1}))$ in the next first radar transmission cycle $T_{w1}$, based on the discrete time $k_{p1}(u)$. In addition, the first phase shift detector 48 detects phase shift conditions $\Delta\Phi(k_p(u), M)$ based on the difference (see Expression (49)) between the first correlation value $AC1_u(k_{p1}(u) + \text{round}(T_{w1}/T_{p1}), M+1)$ and the temporarily stored first correlation value $AC1_u(k_{p1}(u), M)$.

[Expression 49]

$$\Delta\Phi(k_{p1}(u), M) = \text{angle}[AC1_u(k_{p1}(u) + \text{round}(T_{w1}/T_{p1}), M+1) \times AC1_u(k_{p1}(u), M)^*] \quad (49)$$

The first phase shift detector 48 can estimate the Doppler phase shift based on the movement of the target, using the calculation result of Expression (49) showing that a frequency variation increases as $\Delta\Phi1(k_{p1}(u), M)$ increases.

As described above, in the radar device 1y, a plurality of radar transmitters (Tx1 and Tx2) do not perform transmission in synchronization with each other. However, the radar device 1y can estimate the Doppler phase shift included in the reflected wave signal for the same reasons as described above.

Various embodiments have been described above with reference to the drawings, but the present disclosure is not limited thereto. It will be understood by those skilled in the art that various modifications or changes can be made in the scope of the claims and are also included in the technical scope of the present disclosure.

In each of the above-described embodiments, two radar transmitters are provided. However, the present disclosure can also be applied to a case in which three or more radar transmitters are provided. For example, a case in which three radar transmitters are provided will be described. A third radar transmitter is referred to as a radar transmitter Tx3. Since the structure of the radar transmitter Tx3 is the same as that of the radar transmitters Tx1 or the radar transmitter Tx2, the description of the structure of the radar transmitter Tx3 will be omitted.

A third code generator of the radar transmitter Tx3 repeatedly generates a pulse code sequence $b_n$ with a code length L $N_3$ times based on a transmission trigger signal from a third transmission controller. A transmission signal $a_{n\_p3}$ with the code length L is transmitted for a transmission time with a pulse width $T_{p3}$. That is, one code is transmitted for the transmission time with a pulse width $Ts3 = Tp3/L$. In addition, the duration for which the transmission signal $a_{n\_p3}$ is repeatedly transmitted $N_3$ times is $T_{p3} \times N_3$.

Here, a parameter $T_{p3}$ is different from the above-mentioned parameters $T_{p1}$ and $T_{p2}$ and these parameters satisfy Expression (50). In addition, since $T_{p3}$, $T_{p1}$, and $T_{p2}$ satisfy Expression (51), the radar receiver can separately receive the radar transmission signals from the radar transmitters Tx1, Tx2 and Tx3. The operation of the other sections is the same as that of the sections in the radar device 1 according to the first embodiment.

[Expression 50]

$$T_{p1} < T_{p2} < T_{p3} \quad (50)$$

[Expression 51]

$$|T_{p3} - T_{p1}| \geq T_{ad}, |T_{p3} - T_{p2}| \geq T_{ad} \quad (51)$$

In some cases, the reflected wave signal received by the radar receiver according to each of the above-described embodiments is beyond the dynamic range of each A/D converter. In this case, an auto gain control (AGC) section may be provided in front of each A/D converter of each radar receiver. The AGC section controls its gain based on the level of the reflected wave signal, using the output signal from the A/D converter or the input level detection result (for example, receive signal strength indication (RSSI)) of the reception RF section. The radar receiver controls the level of the reflected wave signal within the dynamic range of each A/D converter such that each section after the A/D converter can operate.

The present application is based on Japanese Patent Application No. 2011-123384, filed on Jun. 1, 2011, the contents of which are incorporated herein by reference.

INDUSTRIAL APPLICABILITY

The radar device according to the present disclosure is useful as a radar device which can be achieved by a simple structure without adding a circuit structure for synchronizing the operations of transmission-side systems.

REFERENCE SIGNS LIST 1, 1v, 1w, 1x, 1y: RADAR DEVICE
2, 2b: TRANSMISSION CONTROLLER
3, 3b: TRANSMISSION SIGNAL GENERATOR
4: FIRST CODE GENERATOR
4b: SECOND CODE GENERATOR
5, 5b: MODULATOR
6b: LPF
7, 7b: TRANSMISSION RF SECTION
8, 8b, 12: FREQUENCY CONVERTER
9, 9b, 11: AMPLIFIER
10: RECEPTION RF SECTION
13: QUADRATURE DETECTOR
14, 14v, 14x: SIGNAL PROCESSOR
16: A/D CONVERTER
17: FIRST DELAY SECTION
18: SECOND DELAY SECTION
19: FIRST CORRELATION VALUE CALCULATOR
20: SECOND CORRELATION VALUE CALCULATOR
21: POSITIONING SECTION
22: TRANSMISSION TIME DETECTOR
23: CORRELATION VALUE PEAK DETECTOR
24: ARRIVAL DELAY TIME CALCULATOR
25: TARGET DISTANCE ESTIMATER
26: TARGET POSITION ESTIMATER
27: FIRST ADDER
28: SECOND ADDER
30, 31: CODE SWITCHING SECTION
32: FIRST ANTENNA CORRELATION VALUE CALCULATOR
33: SECOND ANTENNA CORRELATION VALUE CALCULATOR
34: DIRECTION ESTIMATER
35: FIRST TRANSMISSION TIME DETECTOR
36: FIRST PHASE DIFFERENCE CALCULATOR
37: FIRST ARRIVAL DIRECTION CALCULATOR
38: SECOND TRANSMISSION TIME DETECTOR
39: SECOND PHASE DIFFERENCE CALCULATOR
40: SECOND ARRIVAL DIRECTION CALCULATOR
41: DOPPLER PHASE SHIFT ESTIMATER
42, 46: FIRST CORRELATION VALUE PEAK DETECTOR
43: FIRST PHASE DETECTOR
44, 47: FIRST STORAGE SECTION
45, 48: FIRST PHASE SHIFT DETECTOR

The invention claimed is:

1. A radar device comprising:
a first radar transmitter including:
first transmission signal generating circuitry which, in operation, generates a first modulation signal in which a predetermined number of code sequences are repeated using a first code width, each code sequence having a predetermined code length; and
first transmission radio frequency (RF) circuitry which, in operation, converts the first modulation signal into a first RF radar transmission signal and transmits the first radar transmission signal from a first transmission antenna; and
a second radar transmitter including:
second transmission signal generating circuitry which, in operation, generates a second modulation signal in which a predetermined number of code sequences are repeated using a second code width, each code sequence having the predetermined code length;
second transmission RF circuitry which, in operation, converts the second modulation signal into a second RF radar transmission signal and transmits the second radar transmission signal from a second transmission antenna; and
one or more radar receivers including:
reception RF circuitry which, in operation, converts a RF reflected wave signal received by a reception antenna into a baseband signal and performs quadrature detection for the converted baseband signal;
analog to digital (A/D) converting circuitry which, in operation, samples the quadrature-detected baseband signal in a sampling cycle;
first delay circuitry which, in operation, delays an output signal from the A/D converting circuitry by a predetermined number of samples corresponding to the first code width;
first correlation value calculating circuitry which, in operation, calculates a first correlation value based on the output signal from the A/D converting circuitry and an output signal from the first delay circuitry;
second delay circuitry which, in operation, delays the output signal from the A/D converting circuitry by a predetermined number of samples corresponding to the second code width; and
second correlation value calculating circuitry which, in operation, calculates a second correlation value based on the output signal from the A/D converting circuitry and an output signal from the second delay circuitry.

2. The radar device according to claim 1, wherein
the A/D converting circuitry in the one or more radar receivers converts the received first or second radar transmission signal into a discrete signal in a predetermined sampling cycle, and
a difference between the first code width and the second code width is equal to or more than the sampling cycle.

3. The radar device according to claim 1, wherein
the first radar transmitter further includes first transmission controlling circuitry which, in operation, outputs a first transmission trigger signal indicating a generation time of the first modulation signal, and
the second radar transmitter further includes second transmission controlling circuitry which, in operation, outputs a second transmission trigger signal indicating a generation time of the second modulation signal.

4. The radar device according to claim 1, wherein
each of the one or more radar receivers includes:
first adding circuitry which, in operation, adds a predetermined number of outputs from the first correlation value calculating circuitry; and
second adding circuitry which, in operation, adds a predetermined number of outputs from the second correlation value calculating circuitry.

5. A radar device comprising:
a first radar transmitter including:
first transmission signal generating circuitry which, in operation, generates a first modulation signal in which a predetermined number of code sequences are repeated, each code sequence having a first code length; and
first transmission radio frequency (RF) circuitry which, in operation, converts the first modulation signal into a first RF radar transmission signal and transmits the first radar transmission signal from a first transmission antenna;
a second radar transmitter including:
second transmission signal generating circuitry which, in operation, generates a second modulation signal in which a predetermined number of code sequences are repeated, each code sequence having a second code length; and
second transmission RF circuitry which, in operation, converts the second modulation signal into a second RF radar transmission signal and transmits the second radar transmission signal from a second transmission antenna, wherein,
codes in the first modulation signal and the second modulation signal have a common duration and one of the first code length and the second code length is not an integer multiple of the other code length; and
one or more radar receivers including:
reception RF circuitry which, in operation, converts a RF reflected wave signal received by a reception antenna into a baseband signal and performs quadrature detection for the converted baseband signal;
analog to digital (A/D) converting circuitry which, in operation, samples the quadrature-detected baseband signal in a sampling cycle;
first delay circuitry which, in operation, delays an output signal from the A/D converting circuitry by a predetermined number of samples corresponding to the duration of the first modulation signal which corresponds to the first code length;
first correlation value calculating circuitry which, in operation, calculates a first correlation value based on the output signal from the A/D converting circuitry and an output signal from the first delay circuitry;
second delay circuitry which, in operation, delays the output signal from the A/D converting circuitry by a predetermined number of samples corresponding to the duration of the second modulation signal which corresponds to the second code length; and
second correlation value calculating circuitry which, in operation, calculates a second correlation value based on the output signal from the A/D converting circuitry and an output signal from the second delay circuitry.

6. The radar device according to claim 5, wherein
the first radar transmitter further includes first transmission controlling circuitry which, in operation, outputs a first transmission trigger signal indicating a generation time of the first modulation signal, and
the second radar transmitter further includes second transmission controlling circuitry which, in operation, outputs a second transmission trigger signal indicating a generation time of the second modulation signal.

7. The radar device according to claim 1, further comprising:
positioning circuitry which, in operation, estimates a distance to a target based on outputs from the first correlation value calculating circuitry and the second correlation value calculating circuitry, or outputs from the first adding circuitry and the second adding circuitry, wherein,
for each of the one or more radar receivers, the positioning circuitry includes:
transmission time detecting circuitry which, in operation, detects a transmission time of each of the first radar transmission signal and the second radar transmission signal based on the first transmission trigger signal and the second transmission trigger signal;
correlation value peak detecting circuitry which, in operation, detects a peak time of each of the outputs more than a predetermined reference level, based on the outputs from the first correlation value calculating circuitry and the second correlation value calculating circuitry, or the outputs from the first adding circuitry and the second adding circuitry;
arrival delay time calculating circuitry which, in operation, calculates an arrival delay time until the reflected wave signal arrives, based on each of the transmission times detected by the transmission time detecting circuitry and the peak time of each of the outputs detected by the correlation value peak detecting circuitry; and
target distance calculating circuitry which, in operation, estimates a distance to the target based on the calculated arrival delay time.

8. The radar device according to claim 7, wherein
the positioning circuitry further includes target position estimating circuitry which, in operation, estimates the position of the target based on the distance to the target which is estimated by the target distance estimating circuitry and a position of each of the transmission antennas and the reception antenna.

9. The radar device according to claim 1, wherein
the one or more radar receivers include a dual-type of first antenna correlation value calculating circuitry and second antenna correlation value calculating circuitry, and the one or more radar receivers further include a first antenna correlation value calculator and a second antenna correlation value calculator, wherein the first antenna correlation value calculating circuitry, in operation, calculates a third correlation value between an output signal from the first delay circuitry of a second radar receiver and an output signal from the A/D converting circuitry of a first radar receiver and a fourth correlation value between an output signal from the first delay circuitry of the first radar receiver and an output signal from the A/D converting circuitry of the second radar receiver, with reference to the output signals from the A/D converting circuitry and the output signals from the first delay circuitry in the first and second radar receivers, and the second antenna correlation value calculating circuitry, in operation, calculates a fifth correlation value between an output signal from the second delay circuitry of the second radar receiver and the output signal from the A/D converting circuitry of the first radar receiver and a sixth correlation value between an output signal from the second delay circuitry of the first radar receiver and the output signal from the A/D converter of the second radar receiver, with reference to the output signals from the A/D converting circuitry and the output signals from the second delay circuitry in the first and second radar receivers.

10. The radar device according to claim 9, further comprising:

direction estimating circuitry which, in operation, estimates an arrival direction of the reflected wave signal based on the outputs from the first correlation value calculating circuitry and the second correlation value calculating circuitry of the first radar receiver, the first correlation value calculating circuitry and the second correlation value calculating circuitry of the second radar receiver, the first antenna correlation value calculating circuitry, and the second antenna correlation value calculating circuitry, wherein the direction estimating circuitry includes:

first phase difference calculating circuitry which, in operation, calculates a phase component based on the outputs from the first correlation value calculating circuitry of the first radar receiver, the first correlation value calculating circuitry of the second radar receiver, and the first antenna correlation value calculating circuitry; and second phase difference calculating circuitry which, in operation, calculates a phase component based on the outputs from the second correlation value calculating circuitry of the first radar receiver, the second correlation value calculating circuitry of the second radar receiver, and the second antenna correlation value calculating circuitry.

11. The radar device according to claim 1, wherein the first transmission signal generating circuitry, in operation, generates the first modulation signal in which the predetermined number of the code sequences, each of which has the predetermined code length, are repeated using the first code width in a (2m+1)-th radar transmission cycle, where m is an integer equal to or greater than 0, and generates the second modulation signal in which the predetermined number of the code sequences, each of which has the predetermined code length, are repeated using the second code width in a 2m-th radar transmission cycle, and the second transmission signal generating circuitry, in operation, generates the second modulation signal in the (2m+1)-th radar transmission cycle, where m is an integer equal to or greater than 0, and generates the first modulation signal in the 2m-th radar transmission cycle.

12. The radar device according to claim 1, further comprising:

Doppler phase shift estimating circuitry which, in operation, estimates a Doppler phase shift of the target in a first radar transmission cycle and a Doppler phase shift of the target in a second radar transmission cycle, based on the outputs from the first correlation value calculating circuitry and the second correlation value calculating circuitry of the one or more radar receivers in every first radar transmission cycle and the outputs from the first and second correlation value calculating circuitry of the one or more radar receivers in every second radar transmission cycle.

13. The radar device according to claim 12, wherein, for each of the one or more radar receivers, the Doppler phase shift estimating circuitry includes:

correlation value peak detecting circuitry which, in operation, detects a peak time of an output more than a predetermined reference level, based on the output from the first correlation value calculating circuitry or the second correlation value calculating circuitry of each of the one or more radar receivers;

phase detecting circuitry which, in operation, calculates a phase component of the output from the first correlation value calculating circuitry or the second correlation value calculating circuitry at the peak time detected by the correlation value peak detecting circuitry;

storage circuitry which, in operation, stores the calculated phase component and the detected peak time; and phase shift detecting circuitry which, in operation, calculates the Doppler phase shift of the target, based on the stored phase component and peak time, the phase component and the peak time of the output from the first correlation value calculating circuitry or the second correlation value calculating circuitry in the next first radar transmission cycle or the next second radar transmission cycle.

14. The radar device according to claim 12, wherein, for each of the one or more radar receivers, the Doppler phase shift estimating circuitry includes:

correlation value peak detecting circuitry which, in operation, detects a peak time of an output more than a predetermined reference level, based on the output from the first correlation value calculating circuitry or the second correlation value calculating circuitry of each of the one or more radar receivers;

storage circuitry which, in operation, stores the detected peak time and the output from the first correlation value calculating circuitry or the second correlation value calculating circuitry at the peak time; and phase shift detecting circuitry which, in operation, calculates the Doppler phase shift of the target, based on the stored peak time, the output from the first correlation value calculating circuitry or the second correlation value calculating circuitry at the peak time, the peak time which is detected by the correlation value peak detecting circuitry in the next first radar transmission cycle or the next second radar transmission cycle, and the output from the first correlation value calculating circuitry or the second correlation value calculating circuitry at the detected peak time.

* * * * *